(12) United States Patent
Nge et al.

(10) Patent No.: US 11,650,648 B2
(45) Date of Patent: May 16, 2023

(54) METHODS AND APPARATUS TO IMPROVE COMPUTING DEVICE POWER MANAGEMENT

(71) Applicant: Intel Corporation, Santa Clara, CA (US)

(72) Inventors: Chee Lim Nge, Beaverton, OR (US); Maximilian Domeika, Sherwood, OR (US); Soethiha Soe, Beaverton, OR (US); James Hermerding, II, Vancouver, WA (US); Zhongsheng Wang, Portland, OR (US); Wessam Elhefnawy, Fremont, CA (US); Efraim Rotem, Haifa (IL); Christopher Joseph Binns, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/914,029

(22) Filed: Jun. 26, 2020

(65) Prior Publication Data

US 2020/0393889 A1 Dec. 17, 2020

(51) Int. Cl.
| | |
|---|---|
| *G06F 1/32* | (2019.01) |
| *G06F 11/30* | (2006.01) |
| *G06K 9/62* | (2022.01) |
| *G06F 1/3212* | (2019.01) |
| *G06F 1/3296* | (2019.01) |

(52) U.S. Cl.
CPC .......... *G06F 1/3212* (2013.01); *G06F 1/3296* (2013.01); *G06F 11/3062* (2013.01); *G06F 11/3075* (2013.01); *G06K 9/6262* (2013.01)

(58) Field of Classification Search
CPC ............................ G06F 1/3212; G06F 1/3296
See application file for complete search history.

(56) References Cited

U.S. PATENT DOCUMENTS

| | | | |
|---|---|---|---|
| 8,316,247 | B2 | 11/2012 | Theocharous et al. |
| 9,829,947 | B1* | 11/2017 | Nagarajan ............ G06F 1/3212 |
| 2015/0338469 | A1* | 11/2015 | Lee ....................... H02J 7/0047 324/427 |
| 2016/0357654 | A1* | 12/2016 | de la Cropte de Chanterac ......... G06F 1/3203 |
| 2018/0284877 | A1* | 10/2018 | Klein ....................... G06N 5/04 |
| 2019/0305383 | A1* | 10/2019 | Muntes ................. H01M 10/48 |
| 2021/0089105 | A1* | 3/2021 | Iyer ........................ H02J 7/022 |

* cited by examiner

*Primary Examiner* — Jaweed A Abbaszadeh
*Assistant Examiner* — Cheri L Harrington
(74) *Attorney, Agent, or Firm* — Hanley, Flight Zimmerman, LLC

(57) ABSTRACT

Methods, apparatus, systems, and articles of manufacture are disclosed to improve computing device power management. An example apparatus includes a usage classifier to classify usage of a computing system, a low battery probability determiner to determine a probability of the computing system operating with a low battery capacity based on the classification, a policy reward determiner to determine an adjustment of a policy based on at least one of the classification or the probability, and determine a battery capacity of the computing system in response to the adjustment, and a policy adjustor to adjust the policy in response to the battery capacity satisfying a threshold.

28 Claims, 9 Drawing Sheets

METHODS AND APPARATUS TO IMPROVE COMPUTING DEVICE POWER MANAGEMENT

FIELD OF THE DISCLOSURE

This disclosure relates generally to computing devices and, more particularly, to methods and apparatus to improve computing device power management.

BACKGROUND

Computing devices can consume relatively large amounts of energy when executing computationally intensive tasks. Power management tools may be deployed to such computing devices to manage energy expenditure and/or extend battery life. Such power management tools may extend battery life at the expense of system performance.

DETAILED DESCRIPTION

Figure 1:
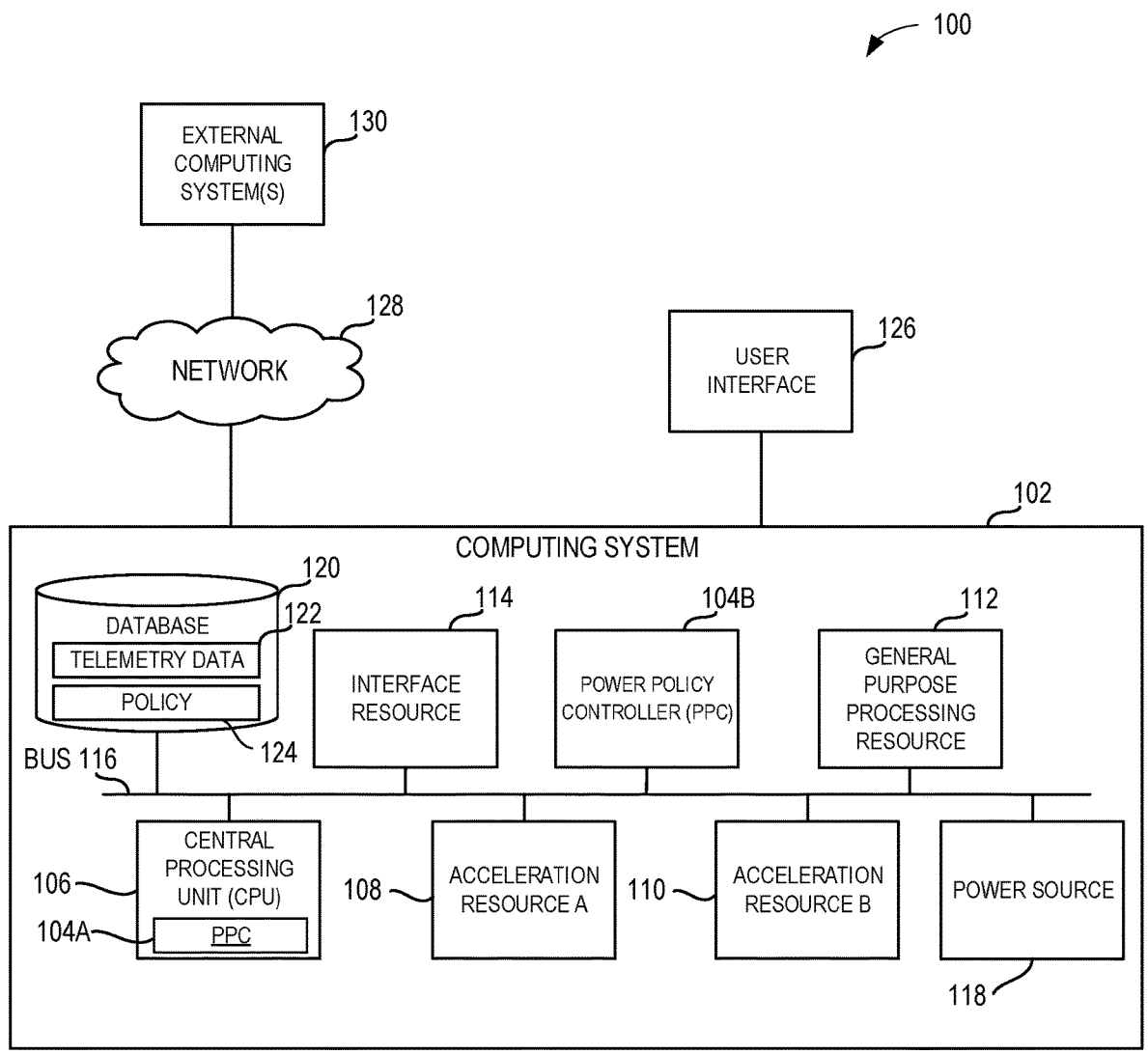
FIG. 1 is a schematic illustration of an example computing system including an example power policy controller to facilitate power management of the computing system.

The figures are not to scale. In general, the same reference numbers will be used throughout the drawing(s) and accompanying written description to refer to the same or like parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Computing devices, systems, etc., can consume relatively large amounts of energy when executing computationally intensive tasks. Power management tools may be deployed on computing devices that are energy limited, such as computing devices that are battery powered. Such power management tools may manage energy expenditure and/or otherwise extend battery life. For example, an operating system (OS) of a computing device may reduce a frequency of an acceleration resource, such as a graphics processing unit, a brightness of a display panel or device, etc., to reduce energy consumption. In other examples, the OS can increase the frequency of the acceleration resource, the brightness of the display panel, etc., when the computing device is not energy limited, such as being plugged into an alternating current (AC) power source (e.g., a wall power outlet).

Mobile computing systems, such as laptops, Internet-enabled tablet computers, etc., need a power policy (e.g., a power management policy) or power profile (e.g., a power management profile) that balances performance and battery life. Some power policies include a preset number of static power policies that are tuned to a set of assumptions that cover a broad range of battery usage behaviors. Such static power policies can be a battery-optimized power policy, a performance-optimized power policy, or a blended power policy. Such static power policies may set a number of power-impacting system characteristics such as display brightness, interrupt (e.g., software interrupt, hardware interrupt, etc.) frequency, and system timeouts.

Some power policies balance battery life and system performance by adapting to a current temperature of a processor. Some power policies balance battery life and system performance based on thermal and workload characteristics of the system, and power delivery capabilities of the system. Some power policies balance battery life and system performance based on past usage behavior and demand on the system to predict future battery life. However, such power policies are not optimized and/or otherwise tailored for any specific usage model and, thus, can compromise battery life and/or performance for most users of the mobile computing systems.

Examples disclosed herein improve computing device power management by adapting a power plan (e.g., a battery power plan, a power management plan, etc.) to at least one of (1) computing behavior or usage associated with a user of the computing device or (2) performance and/or characteristics of hardware included in the computing device to balance the desire for high performance against battery life. Examples disclosed herein include example models (e.g., artificial intelligence models) to learn a usage model of the computing device and adapt (e.g., autonomously adapt) the power policy to maximize and/or otherwise improve system performance while minimizing and/or otherwise reducing a probability that a user will feel low-battery anxiety and, thus, become more likely to charge the computing system.

In some disclosed examples, an example power profile controller determines a likelihood or probability of a user operating a computing system at low battery based on telemetry data from the computing system. For example, the power profile controller determines that a user has relatively low low-battery anxiety by determining that the user is likely to wait until a battery capacity decreases below a battery capacity threshold (e.g., a low battery capacity threshold) (e.g., 5% battery capacity, 20% battery capacity, etc.) prior to plugging the computing system into a charging system (e.g., a portable battery, a wall outlet, etc.). In such examples, the power profile controller adjusts a power profile of the computing system from a first power profile representative of prioritizing system performance to a second power profile representative of prioritizing battery capacity in response to the determination that the user has relatively low low-battery anxiety. In some such examples, the power profile controller adjusts the power profile to prioritize battery capacity to ensure that the computing system does not abruptly turn off in response to the battery capacity decreasing below the battery capacity threshold.

In some such examples, the power profile controller learns and/or otherwise determines that the user charges (e.g., typically charges) the battery prior to the computing system turning off and, thus, the power profile controller can re-adjust the power profile from the second power profile to the first power profile to improve system performance. For example, the power profile controller determines that the computing system does not need to transition into an energy efficiency profile that prioritizes battery capacity over system performance because the user is unlikely to allow the computing system to abruptly turn off due to low battery capacity. In such examples, in response to determining that the likelihood of the computing system operating at the low battery capacity, the power profile controller improves system performance by placing and/or otherwise invoking the computing system to execute a power profile that prioritizes system performance over battery capacity.

In other examples, the power profile controller determines that a user has relatively high low-battery anxiety by determining that the user is unlikely to wait until a battery capacity decreases below a battery capacity threshold (e.g., 5% battery capacity, 20% battery capacity, etc.) prior to plugging the computing system into a charging system. For example, the power profile controller determines that the user is likely to plug in the computing system in response to the computing system having a relatively high battery capacity remaining (e.g., 50% battery capacity, 75% battery capacity, etc.). In such examples, the power profile controller adjusts a power profile of the computing system from a first power profile representative of prioritizing battery capacity to a second power profile representative of prioritizing system performance in response to the determination that the user has relatively high low-battery anxiety. In some such examples, the power profile controller adjusts the power profile to prioritize system performance to improve operation of the computing system in response to determining that the user is unlikely to allow the computing system to abruptly turn off in response to the battery capacity decreasing below a battery capacity threshold. Advantageously, the example power profile controller boosts and/or otherwise improves system performance on the computing system while being energy limited (e.g., using a battery source, not being plugged into a wall outlet, etc.) in response to determining that low-battery operation of the computing system is unlikely and/or otherwise not predicted to occur.

In some disclosed examples, the power profile controller determines to adjust a power policy of a computing system in response to executing one or more artificial intelligence models. Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the example power profile controller may train the model with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model is used. Using a neural network model enables the example power profile controller to classify usage of a computing system, determine a probability representative of whether the computing system is likely to operate with low battery capacity, and/or determine adjustment(s) to a power policy based on at least one of the classification or the probability. In general, machine learning models/architectures that are suitable to use in the example approaches disclosed herein include recurrent neural networks. However, other types of machine learning models could additionally or alternatively be used such as supervised learning artificial neural network models. Example supervised learning artificial neural network models can include two-layer (2-layer) radial basis neural networks (RBN), learning vector quantization (LVQ) classification neural networks, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be model hyperparameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models can be trained using stochastic gradient descent. However, any other training algorithm may additionally or alternatively be used. In examples disclosed herein, training can be performed until the level of error is no longer reducing. In examples disclosed herein, training can be performed locally on the computing system and/or remotely at an external computing system (e.g., a central facility, one or more servers, etc.) communicatively coupled to the computing system. Training is performed using hyperparameters that control how the learning is performed (e.g., a learning rate, a number of layers to be used in the machine learning model, etc.). In examples disclosed herein, hyperparameters that control model performance and training speed are the learning rate and regularization parameter(s). Such hyperparameters are selected by, for example, trial and error to reach an optimal model performance. In some examples, Bayesian hyperparameter optimization is utilized to determine an optimal and/or otherwise improved or more efficient network architecture to avoid model overfitting and improve model's overall applicability. In some examples re-training may be performed. Such re-training may be performed in response to override(s) to model-determined power policy adjustment(s) by a user.

Training is performed using training data. In examples disclosed herein, the training data originates from locally generated data, such as telemetry data from the computing system. In some disclosed examples where supervised training is used, the training data is labeled. Labeling is applied to the training data by a user manually or by an automated data pre-processing system. In some examples, the training data is pre-processed using, for example, an interface (e.g., a telemetry interface) to determine one or more telemetry parameters based on the telemetry data. In some examples, the training data is sub-divided into a first portion of data for training the model, and a second portion of data for validating the model.

Once training is complete, the model is deployed for use as an executable construct that processes an input and provides an output based on the network of nodes and connections defined in the model. The model is stored in memory of the computing system or in a database of a remote computing system. The model may then be executed by the example power policy controller.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is a schematic illustration of an example computing environment 100 including an example computing system 102 including an example power policy controller 104A-B to facilitate power management of the computing system 102. The computing system 102 of the example of FIG. 1 includes an example central processing unit (CPU) 106, a first example acceleration resource (ACCELERATION RESOURCE A) 108, a second example acceleration resource (ACCELERATION RESOURCE B) 110, an example general purpose processing resource 112, an example interface resource 114, an example bus 116, an example power source 118, and an example database 120. The database 120 of the example of FIG. 1 includes example telemetry data 122 and an example policy 124. Further depicted in the example of FIG. 1 is an example user interface 126, an example network 128, and example external computing system(s) 130.

In some examples, the computing system 102 is a system-on-a-chip (SoC) representative of one or more integrated circuits (ICs) (e.g., compact ICs) that incorporate components of a computer or other electronic system in a compact format. For example, the computing system 102 may be implemented with a combination of one or more programmable processors, hardware logic, and/or hardware peripherals and/or interfaces. Additionally or alternatively, the example computing system 102 of FIG. 1 may include memory, input/output (I/O) port(s), and/or secondary storage. For example, the computing system 102 includes the power policy controller 104A-B, the CPU 106, the first acceleration resource 108, the second acceleration resource 110, the general purpose processing resource 112, the interface resource 114, the bus 116, the power source 118, the database 120, the memory, the I/O port(s), and/or the secondary storage all on the same substrate. In some examples, the computing system 102 includes digital, analog, mixed-signal, radio frequency (RF), or other signal processing functions.

In the illustrated example of FIG. 1, the first acceleration resource 108 is a graphics processing unit (GPU). For example, the first acceleration resource 108 is a GPU that generates computer graphics, executes general-purpose computing, etc. The second acceleration resource 110 of the example of FIG. 1 is an AI accelerator. For example, the second acceleration resource 110 is a vision processing unit to effectuate machine or computer vision computing tasks, a physical neural network to train and/or execute a neural network (e.g., a CNN, a DNN, an ANN, an RNN, etc.), etc. The general purpose processing resource 112 of the example of FIG. 1 is a programmable processor, such as a CPU or a GPU. Alternatively, one or more of the first acceleration resource 108, the second acceleration resource 110, and/or the general purpose processing resource 112 may be a different type of hardware such as a digital signal processor (DSP), an application specific integrated circuit (ASIC), a programmable logic device (PLD), and/or a field programmable logic device (FPLD) (e.g., a field-programmable gate array (FPGA)).

In the illustrated example of FIG. 1, the interface resource 114 is representative of one or more interfaces. For example, the interface resource 114 may be implemented by a communication device (e.g., a network interface card (NIC), a smart NIC, etc.) such as a transmitter, a receiver, a transceiver, a modem, a residential gateway, a wireless access point, and/or a network interface to facilitate exchange of data with external machines (e.g., computing devices of any kind) via the network 128. In some examples, the communication is effectuated via an Ethernet connection, a digital subscriber line (DSL) connection, a telephone line connection, a coaxial cable system, a satellite system, a line-of-site wireless system, a cellular telephone system, etc. For example, the interface resource 114 may be implemented by any type of interface standard, such as a wireless fidelity (Wi-Fi) interface, an Ethernet interface, a universal serial bus (USB), a Bluetooth interface, a near field communication (NFC) interface, and/or a PCI express interface.

The computing system 102 includes the power source 118 to deliver power to resource(s) of the computing system 102. In the example of FIG. 1, the power source 118 is a battery. For example, the power source 118 is a limited energy device, such as a lithium-ion battery or any other chargeable battery or power source. In such examples, the power source 118 is chargeable using a power adapter or converter (e.g., an alternating current (AC) to direct current (DC) power converter), a wall outlet (e.g., a 110 V AC wall outlet, a 220 V AC wall outlet, etc.), etc.

The computing system 102 of the example of FIG. 1 includes the database 120 to record data (e.g., the telemetry data 122, the policy 124, etc.). The database 120 of this example may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 120 may additionally or alternatively be implemented by one or more double data rate (DDR) memories, such as DDR, DDR2, DDR3, DDR4, mobile DDR (mDDR), etc. The database 120 may additionally or alternatively be implemented by one or more mass storage devices such as hard disk drive(s), compact disk (CD) drive(s), digital versatile disk (DVD) drive(s), solid-state disk drive(s), etc. While in the illustrated example the database 120 is illustrated as a single database, the database 120 may be implemented by any number and/or type(s) of databases. Furthermore, the data stored in the database 120 may be in any data format such as, for example, binary data, comma delimited data, tab delimited data, structured query language (SQL) structures, etc.

In the illustrated example of FIG. 1, the database 120, and/or, more generally, the computing system 102, stores the policy 124 to effectuate power management of resource(s) of the computing system 102, and/or, more generally, the computing system 102. In some examples, the policy 124 is an energy policy (e.g., an energy management policy), a power policy (e.g., a power management policy), a power profile (e.g., a power management profile), etc., and/or a combination thereof. For example, the policy 124 includes configuration(s), parameter(s), setting(s), mode(s) of operation, etc., of hardware, firmware, and/or software associated with the computing system 102. In such examples, the policy 124 includes a configuration of the first acceleration resource 108 to operate and/or otherwise execute computing task(s) at a first frequency (e.g., a first clock frequency). In some examples, the policy 124 includes a parameter or setting of the interface resource 114, such as a power level of a Wi-Fi antenna. In some examples, the policy 124 includes a frequency associated with a software resource, such as a frequency at which an interrupt (e.g., a software interrupt, an OS interrupt, etc.) is generated.

In the illustrated example of FIG. 1, the computing system 102 is in communication with the user interface 126. For example, the user interface 126 is a graphical user interface (GUI), an application display, etc., presented to a user on a display device in circuit with and/or otherwise in communication with the computing system 102. In such examples, a user controls the computing system 102, adjusts the policy 124, configures collection or measurement intervals to obtain the telemetry data 122, etc., via the user interface 126. Alternatively, the computing system 102 may include the user interface 126.

In the illustrated example of FIG. 1, the power policy controller 104A-B, the CPU 106, the first acceleration resource 108, the second acceleration resource 110, the general purpose processing resource 112, the interface resource 114, the power source 118, and the database 120 are in communication with the bus 116. For example, the bus 116 corresponds to, is representative of, and/or otherwise includes at least one of an Inter-Integrated Circuit (I2C) bus, a Serial Peripheral Interface (SPI) bus, or a Peripheral Component Interconnect (PCI) bus.

The network 128 of the example of FIG. 1 is the Internet. However, the network 128 of this example may be implemented using any suitable wired and/or wireless network(s) including, for example, one or more data buses, one or more Local Area Networks (LANs), one or more wireless LANs, one or more cellular networks, one or more private networks, one or more public networks, etc. The network 128 enables the computing system to be in communication with the external computing system(s) 130. For example, the external computing system(s) 130 corresponds to, is representative of, and/or otherwise includes one or more computer servers, data facilities, cloud services, etc.

In the illustrated example of FIG. 1, the computing system 102 includes a first power policy controller 104A (e.g., a first instance of the power policy controller 104A-B) and a second power policy controller 104B (e.g., a second instance of the power policy controller 104A-B) (collectively referred to herein as the power policy controller 104A-B unless specified otherwise). In the example of FIG. 1, the first power policy controller 104A is implemented by the CPU 106 (e.g., implemented by hardware, software, and/or firmware) and the second power policy controller 104B is external to the CPU 106. For example, the second power policy controller 104B may be implemented by hardware, software, and/or firmware. In such examples, the second power policy controller 104B may be implemented by one or more analog or digital circuit(s), logic circuits, programmable processor(s), programmable controller(s), GPU(s), DSP(s), ASIC(s), PLD(s), and/or FPLD(s)). Additionally or alternatively, the first power policy controller 104A, the second power policy controller 104B, and/or portion(s) thereof, may be virtualized, such as by being implemented using one or more virtual machines. Additionally or alternatively, the first power policy controller 104A and/or the second power policy controller 104B may be implemented by a different resource of the computing system 102, such as the first acceleration resource 108, the second acceleration resource 110, etc. Alternatively, the computing system 102 may not include the first power policy controller 104A or the second power policy controller 104B.

In some examples, the power policy controller 104A-B obtains the telemetry data 122 from resource(s) of the computing system 102, such as the CPU 106, the first acceleration resource 108, the second acceleration resource 110, the general purpose processing resource 112, the interface resource 114, the power source 118, and/or the database 120. In some examples, the telemetry data 122 corresponds to, is representative of, and/or otherwise includes data (e.g., measurements, information, etc.) associated with a resource, such as quality-related information (e.g., hardware, firmware, and/or software parameters, statistics, etc.), configuration information (e.g., hardware, firmware, and/or software attributes), or any other analytics-based data. As used herein, such quality-related information, configuration information, analytics-based data is generally referred to as telemetry (e.g., the telemetry data 122, telemetry information, etc.).

In some examples, the telemetry data 122 includes resource utilization information about the utilization of the resource(s) (e.g., hardware resources, software resources, virtual hardware and/or software resources, etc.), and the efficiency with which those resources are able to meet the demands placed on them. In some examples, the telemetry data 122 includes a utilization (e.g., a percentage of a resource that is utilized or not utilized), a delay (e.g., an average delay) in receiving a computation task for execution (e.g., latency), a rate (e.g., an average rate) at which a resource is available (e.g., bandwidth, throughput, etc.), power expenditure, etc., associated with one(s) of the resource(s) of the computing system 102.

In some examples, the telemetry data 122 associated with the interface resource 114 includes a location of the computing system 102. For example, the telemetry data 122 includes a physical (e.g., a geo-physical) location of the computing system 102 based on network data, such as an Internet Protocol (IP) address, an IP port number, a media access control (MAC) identifier, a subnet mask, etc., or any other data in connection with the network 128 of FIG. 1. In such examples, the telemetry data 122 is indicative of the computing system 102 having an office location (e.g., connected to an enterprise network), a residential location (e.g., an apartment, a house, a high-rise building, etc.), and/or commercial location (e.g., an airport, a cafe, a restaurant, etc.).

In some examples, the power policy controller 104A-B determines a likelihood that the computing system 102 is to execute a level of computationally-intensive applications based on the telemetry data 122. For example, the power policy controller 104A-B determines that the computing system 102 is likely to execute a first or relatively high level of computationally-intensive applications, a second or relatively medium level of computationally-intensive applications, a third or relatively low level of computationally-intensive applications, etc. The respective levels of computationally-intensive applications correspond to a quantification and/or representation of demand being placed on resource(s) of the computing system 102. For example, the relatively high level of computationally-intensive applications is a high or intense demand on the resource(s) (e.g., processor(s), memory, storage, etc., having a relatively high utilization (e.g., 60% utilized, 80% utilized, etc.)). In such examples, the relatively medium level of computationally-intensive applications is a medium, average, and/or typical demand on the resource(s) (e.g., processor(s), memory, storage, etc., having a relatively medium, moderate, and/or typical utilization (e.g., 40% utilized, 50% utilized, etc.)). In some such examples, the relatively low level of computationally-intensive applications is a low or weak demand on the resource(s) (e.g., processor(s), memory, storage, etc., having a relatively medium, average, and/or typical utilization (e.g., 10% utilized, 20% utilized, etc.)). In some such examples, the relatively high level of demand is greater than the relatively medium level of demand, and the relatively medium level of demand is greater than the relatively low level of demand. Additionally or alternatively, there may be fewer or more levels than described herein.

In some such examples, the power policy controller 104A-B determines that the computing system 102 is likely to execute a relatively low level of computationally-intensive (and power demanding) applications, such as browsing applications (e.g., Internet browsing applications) or entertainment-based applications (e.g., streaming audio and/or video) in response to determining that the computing system 102 is in the residential location based on the telemetry data 122. In such examples, the power policy controller 104A-B determines that the power source 118 is likely to be charged in response to the battery capacity satisfying a battery capacity threshold (e.g., a low battery capacity threshold of 5%, 20%, etc.) because of readily available access to wall outlets or other charging sources.

In some examples, the power policy controller 104A-B determines that the computing system 102 is likely to execute a relatively high level of computationally-intensive applications (e.g., executing computer-aided design (CAD) software tools, graphics design software, etc.) in response to determining that the computing system 102 is in the office location. In such examples, the power policy controller 104A-B determines that the power source 118 is likely to be charged in response to the battery capacity satisfying a battery capacity threshold (e.g., 5%, 20%, etc.) because of readily available access to wall outlets or other charging sources in the office location.

In some examples, the power policy controller 104A-B determines that the computing system 102 is likely to execute a relatively medium level of computationally-intensive applications (e.g., Word processing, streaming audio and/or video, etc., and/or a combination thereof) in response to determining that the computing system 102 is in the commercial location. In such examples, the power policy controller 104A-B determines that the power source 118 is unlikely to be charged in response to the battery capacity satisfying a battery capacity threshold (e.g., 5%, 20%, etc.) because of not as readily available access to wall outlets or other charging sources in the commercial location.

In some examples, the telemetry data 122 associated with the power source 118 includes a battery capacity measurement (e.g., a percentage of battery life remaining, a quantity of stored energy remaining, etc.), an estimated time remaining before the power source 118 is depleted or drained, an estimated time to charge the power source 118 to a battery capacity threshold, a power transition event, power charging quality, etc. For example, the power transition event is a change from the power source 118 not being charged to being charged, being charged to not being charged, etc. In other examples, power charging quality is a first level of power charging quality indicative of the power source 118 being charged from a reliable or unlimited charging source, such as a wall outlet, a second level of power charging quality indicative of the power source 118 being charged from an unreliable or limited charging source, such as a portable battery, etc.

In some examples, the telemetry data 122 associated with the CPU 106 includes whether the CPU 106 is executing or retiring an instruction, executing a logical cycle, executing a reference cycle, executing a call, executing a direct call, executing a service (e.g., a firmware and/or software service) or process (e.g., a firmware and/or software process) (e.g., a particular or specified service or process of interest), etc. In some examples, the telemetry data 122 associated with the CPU 106 includes a value of a hardware counter (e.g., a hardware performance counter), a software counter (e.g., a software performance counter), etc., included in the CPU 106 that is used to monitor a function of the CPU 106. In some examples, the telemetry data 122 associated with the database 120 includes a quantity of read/write cycles executed by the database 120 or portion(s) or partition(s) thereof, a latency of the database 120, a percentage or portion of the database 120 that is available to execute a storage task, etc.

In some examples, the power policy controller 104A-B classifies usage of the resource(s) of the computing system 102, and/or, more generally, the computing system 102, based on the telemetry data 122. For example, the power policy controller 104A-B determines whether usage of the computing system 102 is a first usage level (e.g., a light or low usage level), a second usage level (e.g., a medium usage level), a third usage level (e.g., a heavy or high usage level), etc., where the first usage level is less than the second usage level, the second usage level is less than the third usage level, etc. In such examples, the first usage level is representative of the computing system 102 executing tasks having a relatively low computational intensity, such as word processing or Internet browsing. In other examples, the third usage level is representative of the computing system 102 executing tasks having a relatively high computational intensity, such as artificial intelligence, computer modeling or simulation, or content creation tasks such as audio, graphics, and/or video generation. In some examples, the first usage level is representative of a first demand for resource(s), the second usage level is representative of a second demand for resource(s), the third usage level is representative of a third demand for resource(s), etc., where the first demand is less than the second demand, and the second demand is less than the third demand, etc.

In some examples, the power policy controller 104A-B determines a low battery probability based on the classification of the usage. For example, the low battery probability is representative of a likelihood that the computing system 102 will operate having a low battery capacity (e.g., 5% battery capacity, 10% battery capacity, etc.). In such examples, the power policy controller 104A-B determines the low battery probability based on a classification of a user having low, medium, high, etc., low-battery anxiety. For example, the low battery probability is indicative of and/or otherwise representative of a user having a relatively high level of low-battery anxiety who is likely to charge the power source 118 before the power source 118 falls below a battery capacity threshold. In such examples, the user with the relatively high level of low-battery anxiety is unlikely to operate the computing system 102 with the power source 118 having a low battery capacity. In other examples, the low battery probability is indicative of a user having a relatively low level of low-battery anxiety who is unlikely to charge the power source 118 before the power source 118 falls below a battery capacity threshold and, thus, may cause the computing system 102 to shut down (e.g., abruptly shut down) prior to the user having an opportunity to charge the power source 118. In such examples, the user with the relatively low level of low-battery anxiety is likely to operate the computing system 102 with the power source 118 having a low battery capacity.

In some examples, the power policy controller 104A-B determines an adjustment (e.g., a policy adjustment, a power policy adjustment, etc.) to the policy 124 based on at least one of the classification of the usage or the low battery probability. For example, the power policy controller 104A-B determines one or more adjustments to the policy 124 to improve energy efficiency based on a classification of heavy usage and a low battery probability indicative of a user with a relatively low low-battery anxiety. In such examples, the power policy controller 104A-B determines to improve energy efficiency because the power source 118 may decrease enough in battery capacity to fall below a battery capacity threshold without intervention based on at least one of the classification or the low battery probability.

In other examples, the power policy controller 104A-B determines one or more adjustments to the policy 124 to improve performance (e.g., system performance) of the computing system 102 based on a classification of heavy usage and a low battery probability indicative of a user with a relatively high low-battery anxiety. In such examples, the power policy controller 104A-B determines to improve system performance because the low battery probability indicates that the user is likely to charge the power source 118 before the battery capacity falls below a battery capacity threshold, or indicative that the user is unlikely to use the computing system 102 on battery for a relatively short period of time that likely does not require the power source 118 to be charged.

Advantageously, in some examples, the power policy controller 104A-B of the example of FIG. 1 improves performance (e.g., increasing a frequency of the first acceleration resource 108, boost power to a Wi-Fi antenna of the interface resource 114, etc.) of the computing system 102 in response to the power policy controller 104A-B determining that the capacity of the power source 118 is below a first threshold (e.g., 40% capacity, 50% capacity, etc.) and higher than a second threshold (e.g., 5% capacity, 10% capacity, etc.), where the second threshold is less than the first threshold. Advantageously, in some examples, the power policy controller 104A-B of the example of FIG. 1 improves the performance of the computing system 102 based on at least one of the classification of the computing system usage or the low battery probability and, thus, improves the power policy controller 104A-B effectuating one or more improvement(s) in the functioning of a computer, such as the computing system 102.

Figure 2:
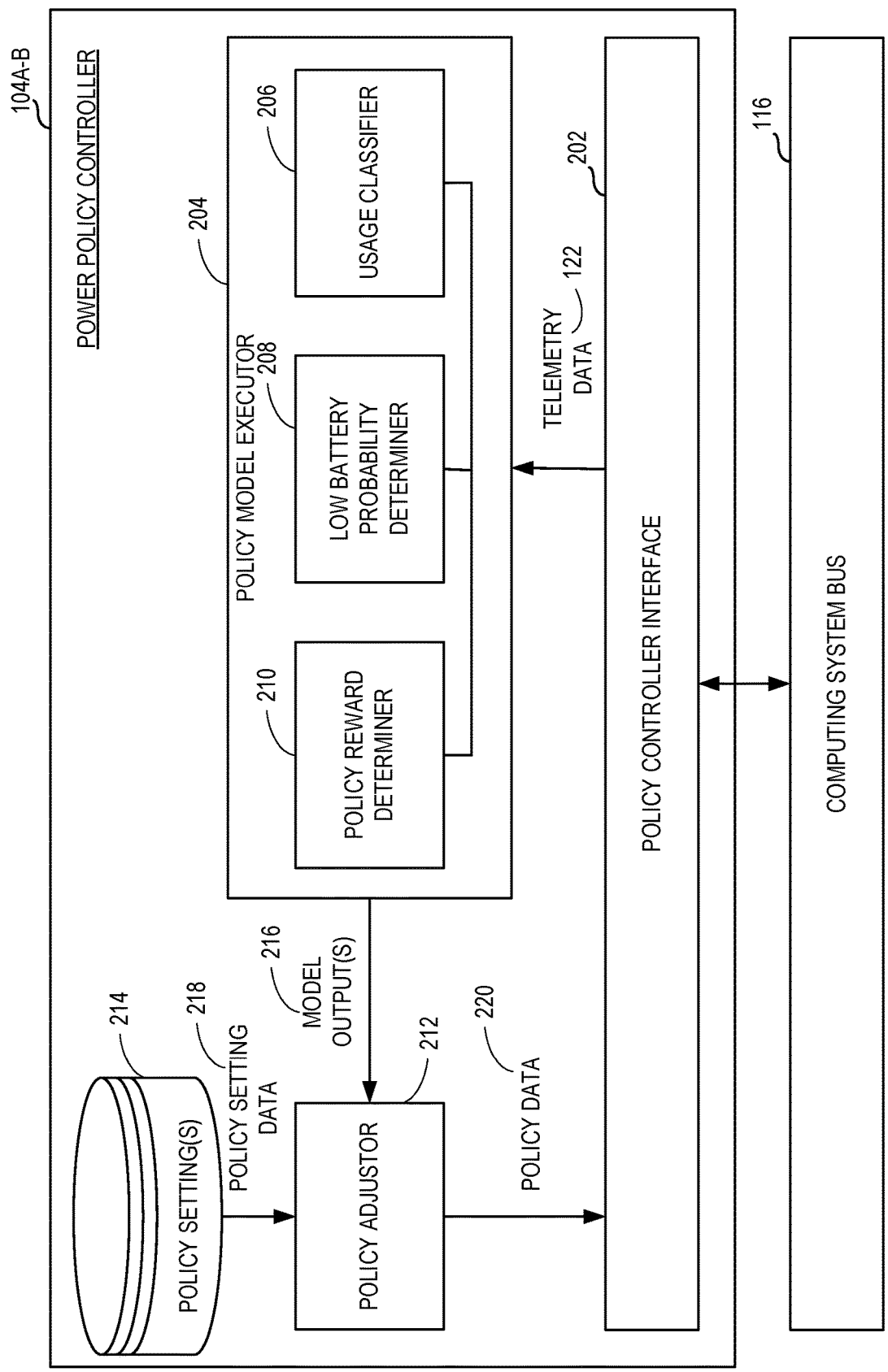
FIG. 2 is a block diagram of an example implementation of the example power policy controller of FIG. 1 including an example policy adjustor.

FIG. 2 is a block diagram of an example implementation of the example power policy controller 104A-B of FIG. 1. The power policy controller 104A-B of the example of FIG. 2 includes an example policy controller interface 202, an example policy model executor 204, an example usage classifier 206, an example low battery probability determiner 208, an example policy reward determiner 210, an example policy adjustor 212, and example policy setting(s) 214.

In the illustrated example of FIG. 2, the power policy controller 104A-B includes the policy model executor 204 to generate, train, and/or execute at least one of the usage classifier 206, the low battery probability determiner 208, or the policy reward determiner 210. In the example of FIG. 2, the policy model executor 204 obtains the telemetry data 122 of FIG. 1 from resource(s) of the computing system 102 of FIG. 1 via the policy controller interface 202, which obtains the telemetry data 122 from the bus 116 of FIG. 1 (COMPUTING SYSTEM BUS). In some examples, the policy model executor 204 generates and/or trains at least one of the usage classifier 206, the low battery probability determiner 208, or the policy reward determiner 210 based on the telemetry data 122. In the example of FIG. 2, the policy model executor 204 executes and/or otherwise invokes at least one of the usage classifier 206, the low battery probability determiner 208, or the policy reward determiner 210 to generate example model output(s) 216.

In the illustrated example of FIG. 2, the policy model executor 204 includes the usage classifier 206 to classify and/or otherwise characterize usage of the computing system 102 of FIG. 1. In this example, the usage classifier 206 may be implemented by one or more ML/AI models. For example, the usage classifier 206 may be implemented by one or more neural networks, such as one or more RNNs or any other type and/or quantity of neural networks. In such examples, the policy model executor 204 invokes execution of the neural network represented by the usage classifier 206 to generate the model output(s) 216 to include a classification of the usage, a classification of a user associated with the computing system 102, etc. For example, the usage classifier 206 generates a first usage classification representative of relatively low usage or demand on the resource(s) of the computing system 102, a second usage classification representative of relatively high usage or demand on the resource(s) of the computing system 102, a third usage classification representative of usage or demand on the resource(s) of the computing system 102 that is between the low usage and the high usage, etc.

In some examples, the usage classifier 206 implements means for classifying usage of a computing system, such as the computing system 102. In this example, the classifying means is implemented by any processor structured to perform the corresponding operation by executing software or firmware, or hardware circuit (e.g., discrete and/or integrated analog and/or digital circuitry, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 2, the policy model executor 204 includes the low battery probability determiner 208 to determine a probability of the computing system 102 operating with a low battery capacity based on the classification by the usage classifier 206. For example, the low battery probability determiner 208 determines a low battery probability. In such examples, the low battery probability determiner 208 determines a low battery probability that corresponds to a usage classification (e.g., a first low battery probability that corresponds to a first usage classification, a second low battery probability that corresponds to a second usage classification, etc.). In this example, the low battery probability determiner 208 may be implemented by one or more ML/AI models. For example, the low battery probability determiner 208 may be implemented by one or more neural networks, such as one or more RNNs or any other type and/or quantity of neural networks. In such examples, the policy model executor 204 invokes execution of the neural network represented by the low battery probability determiner 208 to generate the model output(s) 216 to include a probability indicative of whether the user associated with the computing system 102 has a low level of low-battery anxiety, a high level of low-battery anxiety, or a medium level of low-battery anxiety between the low level and the high level. For example, the low battery probability determiner 208 determines the probability to be indicative of a likelihood that the computing system 102 is to operate with the power source 118 having a battery capacity that satisfies a battery capacity threshold by being less than the battery capacity threshold.

In some examples, the low battery probability determiner 208 implements means for determining a probability of a computing system, such as the computing system 102, operating with a low battery capacity based on a classification (e.g., a usage classification). In this example, the determining means is implemented by any processor structured to perform the corresponding operation by executing software or firmware, or hardware circuit (e.g., discrete and/or integrated analog and/or digital circuitry, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 2, the policy model executor 204 includes the policy reward determiner 210 to determine power policy adjustment(s), reward(s) (e.g., policy reward(s), power policy reward(s), etc.), etc., based on at least one of the classification or the probability, and determine a battery capacity of the power source 118, and/or, more generally, the computing system 102, in response to the power policy adjustment(s). In this example, the policy reward determiner 210 may be implemented by one or more ML/AI models. For example, the policy reward determiner 210 may be implemented by one or more neural networks, such as one or more RNNs or any other type and/or quantity of neural networks. In such examples, the policy model executor 204 invokes execution of the neural network represented by the policy reward determiner 210 to generate the model output(s) 216 to include one or more power policy adjustments to the policy 124 of FIG. 1, one or more rewards, etc.

In some examples, the policy reward determiner 210 generates and/or otherwise determines one or more power policy adjustments to the policy 124 based on at least one of the classification or the low battery probability. For example, the policy reward determiner 210 determines a first power policy adjustment of increasing a frequency of the second acceleration resource 110 of FIG. 1 to improve system performance and a second power policy adjustment of decreasing power delivered to a Wi-Fi antenna of the interface resource 114 of FIG. 1.

In some examples, the policy reward determiner 210 generates a reward corresponding to a power policy adjustment. In some examples, a reward (e.g., a policy reward, a power policy reward, etc.) is a reinforcement (e.g., an AI/ML reinforcement) used in an AI/ML model to invoke the AI/ML model to generate an output directed to a specific goal, such as improving energy efficiency, system performance, etc. For example, the reward is an impact or quantification of how the one or more power policy adjustments cause a change or adjustment to the battery capacity of the power source 118.

In some examples, the policy reward determiner 210 predicts, estimates, and/or otherwise determines a policy reward based on an impact on the battery capacity of the power source 118 in response to at least one of the first power policy adjustment or the second power policy adjustment. For example, the policy reward determiner 210 determines a first impact (e.g., a first battery capacity impact, a first battery capacity impact value or quantifier, etc.) on the battery capacity such that the battery capacity may diminish by 10% after a period of time (e.g., 30 minutes, 2 hours, etc.) in response to the first power policy adjustment. In such examples, the policy reward determiner 210 determines a first policy reward to be relatively high in response to a usage of the computing system 102 being classified as heavy usage and the probability of the computing system 102 operating in a low-battery capacity state is low. For example, the first policy reward is to be relatively high because increasing the frequency of the first acceleration resource 108 will improve system performance of the computing system 102, which is unlikely to suddenly turn off due to low battery because a user of the computing system 102 has relatively high low-battery anxiety.

In some examples, the policy reward determiner 210 determines a second impact (e.g., a second battery capacity impact, a second battery capacity impact value or quantifier) on the battery capacity such that the battery capacity may diminish by 1% after a period of time (e.g., 30 minutes, 2 hours, etc.) in response to the second power policy adjustment. In such examples, the policy reward determiner 210 determines a second policy reward to be relatively low in response to a usage of the computing system 102 being classified as heavy usage and the probability of the computing system 102 operating in a low-battery capacity state is low. For example, the second policy reward is to be relatively low because decreasing the power delivered to the Wi-Fi antenna of the interface resource 114 will not improve system performance of the computing system 102 and will not substantially improve the energy efficiency for the computing system 102 that is unlikely to suddenly turn off due to low battery because a user of the computing system 102 has relatively high low-battery anxiety. In some such examples, the model output(s) 216 include(s) the first power policy adjustment, the second power policy adjustment, the first impact, the second impact, the first policy reward, and/or the second policy reward.

In some examples, the policy reward determiner 210 implements means for determining and/or means for identifying an adjustment of a policy, such as the policy 124, based on at least one of a classification (e.g., a usage classification) or a probability (e.g., a low battery probability). In some examples, the policy reward determiner 210 implements means for determining and/or means for predicting a battery capacity of a computing system, such as the computing system 102, in response to the adjustment. In such examples, the determining means, the identifying means, and/or the predicting means is/are implemented by any processor structured to perform the corresponding operation by executing software or firmware, or hardware circuit (e.g., discrete and/or integrated analog and/or digital circuitry, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 2, the power policy controller 104A-B includes the policy adjustor 212 to adjust a power policy, such as the policy 124 of FIG. 1, of the computing system 102 based on at least one of the model output(s) 216 or example policy setting data 218 from the policy setting(s) 214. In some examples, the policy adjustor 212 determines whether to adjust the policy 124 with one or more policy adjustments based on at least one of the classification(s), the low battery probability, the impacts, etc., from the policy model executor 204. In such examples, the policy adjustor 212 generates example policy data 220 based on the determination whether to adjust the policy 124. For example, the policy data 220 includes adjustment(s) to the policy 124.

In some examples, the policy adjustor 212 queries the policy setting(s) 214 for the policy setting data 218. For example, the policy setting(s) 214 include(s) states (e.g., power states) of the resource(s) of the computing system 102. In such examples, the states are representative of configurations, parameters, settings, etc., of one(s) of the resource(s) (e.g., hardware, firmware, and/or software resource(s)) that are modifiable and/or otherwise adjustable to improve performance (e.g., improve performance at the expense of energy efficiency), improve energy efficiency (e.g., improve energy efficiency at the expense of performance), etc. For example, the policy setting(s) 214 include(s) a first state of the first acceleration resource 108 of FIG. 1 that is representative of a first frequency for the first acceleration resource 108 to execute computing task(s), a second state of the first acceleration resource 108 that is representative of a second frequency for the first acceleration resource 108 to execute computing task(s), etc.

In some examples, the policy adjustor 212 implements means for adjusting a policy, such as the policy 124, in response to a battery capacity satisfying a threshold. In some examples, the policy is a first policy, and the means for adjusting is to adjust the first policy to a second policy in response to a probability, such as a low battery probability, satisfying a low battery probability threshold. In such examples, the first policy is to improve performance of a computing system, such as the computing system 102, and the second policy is to improve energy efficiency of the computing system. In some examples, the policy is a first policy, and the means for adjusting is to adjust the first policy to a second policy in response to the probability not satisfying a low battery probability threshold, where the first policy is to improve energy efficiency of the computing system and the second policy to improve performance of the computing system. In some examples, the policy is representative of improving performance of the computing system, and the means for adjusting is to adjust the policy by at least one of increasing a first frequency associated with a hardware resource (e.g., a resource of the computing system 102), increasing a second frequency associated with a software resource (e.g., a software resource of the computing system 102), or increasing power delivery to an antenna (e.g., an antenna of the interface resource 114). In some examples, the adjustment is a first adjustment representative of a first state of a hardware resource, and, in response to the battery capacity not satisfying the threshold, the means for adjusting is to determine a second adjustment representative of a second state of the hardware resource. In such examples, the first state is to cause a first energy expenditure greater than a second energy expenditure by the second state.

In these examples, the adjustment means is implemented by any processor structured to perform the corresponding operation by executing software or firmware, or hardware circuit (e.g., discrete and/or integrated analog and/or digital circuitry, a PLD, a FPLD, an ASIC, a comparator, an operational-amplifier (op-amp), a logic circuit, etc.) structured to perform the corresponding operation without executing software or firmware, but other structures are likewise appropriate.

In some examples, the policy setting(s) 214 include(s) states of an OS of the computing system 102, which is/are representative of different intervals to generate exceptions or interrupts (e.g., firmware, software, and/or OS interrupts). In some examples, the policy setting data 218 includes the states, such as the configurations, parameters, settings, etc., of one(s) of the resource(s) (e.g., hardware, firmware, and/or software resource(s)) of the computing system 102.

The policy setting(s) 214 of this example may be implemented by one or more databases that record data (e.g., the states, the policy setting data 218, etc.). For example, the policy setting(s) 214 may be implemented by a volatile memory (e.g., an SDRAM, DRAM, RDRAM, etc.) and/or a non-volatile memory (e.g., flash memory). The policy setting(s) 214 of this example may additionally or alternatively be implemented by one or more DDR memories, such as DDR, DDR2, DDR3, DDR4, mDDR, etc. The policy setting(s) 214 may additionally or alternatively be implemented by one or more mass storage devices such as hard disk drive(s), CD drive(s), DVD drive(s), solid-state disk drive(s), etc. While in the illustrated example the policy setting(s) 214 is illustrated as a single database, the policy setting(s) 214 may be implemented by any number and/or type(s) of databases. Furthermore, the data stored in the policy setting(s) 214 may be in any data format such as, for example, binary data, comma delimited data, tab delimited data, SQL structures, etc.

In the illustrated example of FIG. 2, the power policy controller 104A-B includes the policy controller interface 202 to obtain the telemetry data 122 from the bus 116 and transmit the policy data 220 to the bus 116. In some examples, the policy controller interface 202 is implemented by one or more libraries (e.g., a dynamic link library (DLL)), one or more application programming interfaces (APIs), etc. In some examples, the policy controller interface 202 processes (e.g., pre-processes) the telemetry data 122. For example, the policy controller interface 202 extracts information from the telemetry data 122 and generates and/or otherwise determines telemetry parameters based on the extracted information. For example, the policy controller interface 202 extracts an IP address from the telemetry data 122 and determines a telemetry parameter, such as a location of the computing system 102, based on the IP address. In other examples, the policy controller interface 202 extracts data associated with hardware, software, and/or firmware counters in the CPU 106 and determines a utilization of the CPU 106 based on the extracted data.

In some examples, the policy controller interface 202 implements means for determining (e.g., first means for determining, second means for determining, etc.) a telemetry parameter based on telemetry data, such as the telemetry data 122, obtained from a computing system, such as the computing system 102. In such examples, the telemetry parameter is based on at least one of a location, a process, a power transition event, or a power source associated with the computing system. In this example, the determining means is implemented by any processor structured to perform the corresponding operation by executing software or firmware, or hardware circuit (e.g., discrete and/or integrated analog and/or digital circuitry, a PLD, a FPLD, an ASIC, a comparator, an operational-amplifier (op-amp), a logic circuit, etc.) structured to perform the corresponding operation without executing software or firmware, but other structures are likewise appropriate.

While an example manner of implementing the power policy controller 104A-B of FIG. 1 is illustrated in FIG. 2, one or more of the elements, processes and/or devices illustrated in FIG. 2 may be combined, divided, re-arranged, omitted, eliminated and/or implemented in any other way. Further, the example policy controller interface 202, the example policy model executor 204, the example usage classifier 206, the example low battery probability determiner 208, the example policy reward determiner 210, the example policy adjustor 212, the example policy setting(s) 214, and/or, more generally, the example power policy controller 104A-B of FIG. 1 may be implemented by hardware, software, firmware and/or any combination of hardware, software and/or firmware. Thus, for example, any of the example policy controller interface 202, the example policy model executor 204, the example usage classifier 206, the example low battery probability determiner 208, the example policy reward determiner 210, the example policy adjustor 212, the example policy setting(s) 214, and/or, more generally, the example power policy controller 104A-B could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example policy controller interface 202, the example policy model executor 204, the example usage classifier 206, the example low battery probability determiner 208, the example policy reward determiner 210, the example policy adjustor 212, and/or the example policy setting(s) 214 is/are hereby expressly defined to include a non-transitory computer readable storage device or storage disk such as a memory, a DVD, a CD, a Blu-ray disk, etc., including the software and/or firmware. Further still, the example power policy controller 104A-B of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
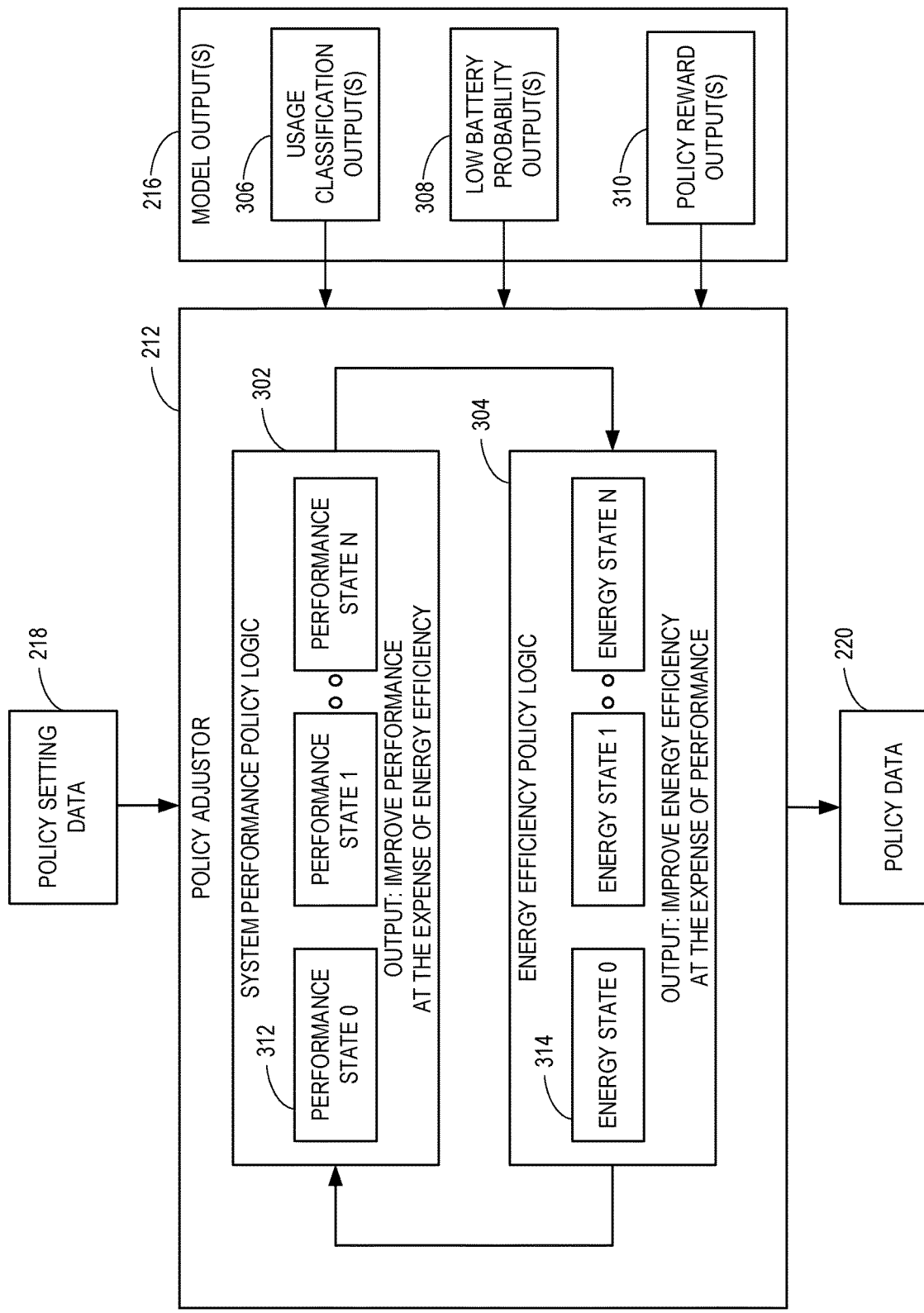
FIG. 3 is a block diagram of an example implementation of the example policy adjustor of FIG. 2.

FIG. 3 is a block diagram of an example implementation of the example policy adjustor 212 of FIG. 2. The policy adjustor 212 of the example of FIG. 3 includes example system performance policy logic 302 and example energy efficiency policy logic 304. In some examples, the system performance policy logic 302 and/or the energy efficiency policy logic 304 may be implemented by example hardware logic, example machine readable instructions, example hardware implemented state machines, and/or any combination thereof.

In some examples, the policy adjustor 212 invokes at least one of the system performance policy logic 302 and/or the energy efficiency policy logic 304 to generate the policy data 220 of FIG. 2 based on output(s) of respective one(s) of the logic. For example, the policy adjustor 212 generates and/or otherwise determines the policy data 220 based on at least one of the model output(s) 216 of FIG. 2 or the policy setting data 218 of FIG. 2.

In the illustrated example of FIG. 3, the model output(s) 216 include(s) example usage classification output(s) 306, example low battery probability output(s) 308, and example policy reward output(s) 310. For example, the usage classifier 206 of FIG. 2 generates, determines, and/or otherwise outputs the usage classification output(s) 306. In such examples, the usage classifier 206 generates the usage classification output(s) 306 to include a classification of usage of the computing system 102. For example, the classification can be a first usage classification, a second usage classification, etc. In such examples, the first classification is a first classification of heavy usage or resource demand, the second classification is a second classification of medium usage or resource demand, the third classification is a third classification of low usage or resource demand, etc., of the computing system 102.

The low battery probability determiner 208 of the example of FIG. 2 generates, determines, and/or otherwise outputs the low battery probability output(s) 308. For example, the low battery probability determiner 208 of FIG. 2 generates the low battery probability output(s) 308 to include one or more probability values, such as a classical probability value (e.g., an a priori or theoretical probability value), an empirical probability value (e.g., a posteriori or frequentist probability value), an axiomatic probability value, etc. In such examples, the one or more probability values of the low battery probability output(s) 308 is indicative of a likelihood that the computing system 102 is to operate with the power source 118 having a battery capacity less than a battery capacity threshold.

The policy reward determiner 210 of the example of FIG. 2 generates, determines, and/or otherwise outputs the policy reward output(s) 310. For example, the policy reward determiner 210 of FIG. 2 generates the policy reward output(s) 310 to include policy adjustment(s), a policy reward for respective one(s) of policy adjustment(s), etc. In such examples, the policy reward determiner 210 generates a plurality of policy adjustments including a first policy adjustment (e.g., a first power policy adjustment) and a second policy adjustment (e.g., a second power policy adjustment). In some examples, the policy reward determiner 210 determines a first policy reward representative of a change (e.g., a potential change, a predicted change, an estimated change, etc.) of a battery capacity of the power source 118 in response to the first policy adjustment.

In some examples, the policy reward determiner 210 determines the first policy reward to be relatively high in response to (1) the first policy adjustment being a throttling of the first acceleration resource 108 of FIG. 1 higher (e.g., increase a frequency of the first acceleration resource 108) and (2) the usage classification being indicative of heavy usage (e.g., content creation, computationally-intensive usage, etc.). In other examples, the policy reward determiner 210 determines the first policy reward to be relatively low in response to (1) the first policy adjustment being a throttling of the first acceleration resource 108 of FIG. 1 lower (e.g., decrease a frequency of the first acceleration resource 108) and (2) the usage classification being indicative of light usage (e.g., Internet browsing, text processing, etc.). In such examples, the first policy reward is relatively low because the usage classification is not indicative of heavy demand on the first acceleration resource 108 and, thus, throttling down the first acceleration resource 108 is unlikely to have a relatively large impact on the battery capacity of the power source 118. In yet other examples, policy reward determiner 210 determines the first policy reward to be relatively high in response to (1) the first policy adjustment being a throttling of the first acceleration resource 108 of FIG. 1 lower (e.g., decrease a frequency of the first acceleration resource 108) and (2) the usage classification being indicative of light usage (e.g., Internet browsing, text processing, etc.). In such examples, the first policy reward is relatively high because although the usage classification is not indicative of heavy demand on the first acceleration resource 108, the policy reward determiner 210 determines that throttling down the first acceleration resource 108 is likely to have an impact on the battery capacity of the power source 118 by saving power and/or otherwise operating the first acceleration resource 108, and/or, more generally, the computing system 102, in a low power mode.

In the illustrated example of FIG. 3, the policy adjustor 212 maps power policy adjustments included in the model output(s) 216 to an execution of either the system performance policy logic 302 or the energy efficiency policy logic 304. For example, the policy adjustor 212 maps a first power policy adjustment of increasing a frequency of the first acceleration resource 108 to improving system performance and, thus, maps the first power policy adjustment to the system performance policy logic 302. In such examples, the policy adjustor 212 invokes the system performance policy logic 302 in response to the mapping. In other examples, the policy adjustor 212 maps a second power policy adjustment of reducing power delivered to an antenna of the interface resource 114 to improving energy efficiency and, thus, maps the second power policy adjustment to the energy efficiency policy logic 304. In such examples, the policy adjustor 212 invokes the energy efficiency policy logic 304 in response to the mapping.

In some examples, the policy adjustor 212 invokes execution of the system performance policy logic 302 to generate the policy data 220 to be indicative of improving performance of the computing system 102 at an expense of energy efficiency. In the example of FIG. 3, the system performance policy logic 302 determines whether to adjust example performance states 312 of one(s) of the resource(s) of the computing system 102.

The performance states 312 of this example correspond to one or more of the CPU 106, the first acceleration resource 108, the second acceleration resource 110, etc., of the computing system 102 of FIG. 1. For example, the performance states 312 correspond to the CPU 106. In other examples, each of the performance states 312 corresponds to one of the CPU 106, the first acceleration resource 108, the second acceleration resource 110, etc.

In some examples, a first performance state (PERFORMANCE STATE 0) of the performance states 312 correspond to a first performance state of the CPU 106, a first performance state of the first acceleration resource 108, a first performance state of the second acceleration resource 110, etc., of FIG. 1. In such examples, the first performance state is representative of a first frequency of the CPU 106, a first power level to deliver to a Bluetooth interface of the interface resource 114, etc.

In some examples, a second performance state (PERFORMANCE STATE 1) of the performance states 312 corresponds to a second performance state of the CPU 106, a second performance state of the first acceleration resource 108, a second performance state of the second acceleration resource 110, etc., of FIG. 1. In such examples, the second performance state is representative of a second frequency of the CPU 106 greater than the first frequency, a second power level to deliver to the Bluetooth interface of the interface resource 114 greater than the first power level, etc.

Advantageously, in some examples, the policy adjustor 212 invokes the system performance policy logic 302 to adjust and/or otherwise transition from the first performance state to the second performance state to adjust the policy 124 of FIG. 1 to increase and/or otherwise improve performance of the computing system 102. In some examples, the policy adjustor 212 invokes the system performance policy logic 302 to adjust and/or otherwise transition from the second performance state to the first performance state to adjust the policy 124 of FIG. 1 to decrease and/or otherwise decrease performance of the computing system 102.

In the illustrated example of FIG. 3, the policy adjustor 212 invokes the energy efficiency policy logic 304 to generate the policy data 220 to be indicative of improving energy efficiency of the computing system 102 at the expense of performance. In the example of FIG. 3, the energy efficiency policy logic 304 determines whether to adjust example energy states (e.g., energy efficiency states) 314 of one(s) of the resource(s) of the computing system 102. The energy states 314 of this example correspond to one or more of the CPU 106, the first acceleration resource 108, the second acceleration resource 110, etc., of the computing system 102 of FIG. 1. For example, the energy states 314 correspond to the CPU 106. In other examples, each of the energy states 314 corresponds to one of the CPU 106, the first acceleration resource 108, the second acceleration resource 110, etc.

In some examples, a first energy state (ENERGY STATE 0) of the energy states 314 corresponds to a first energy state of the CPU 106, a first energy state of the first acceleration resource 108, a first energy state of the second acceleration resource 110, etc., of FIG. 1. In such examples, the first energy state is representative of a first frequency of the first acceleration resource 108, a first power level to deliver to a Wi-Fi interface of the interface resource 114, a determination to use a discrete graphics card, etc.

In some examples, a second energy state (ENERGY STATE 1) of the energy states 314 corresponds to a second energy state of the CPU 106, a second energy state of the first acceleration resource 108, a second energy state of the second acceleration resource 110, etc., of FIG. 1. In such examples, the second energy state is representative of a second frequency of the first acceleration resource 108 less than the first frequency, a second power level to deliver to the Wi-Fi interface of the interface resource 114 less than the first power level, a determination to use an integrated graphics card that uses less energy than the discrete graphics card, etc.

Advantageously, in some examples, the policy adjustor 212 invokes the energy efficiency policy logic 304 to adjust and/or otherwise transition from the first energy state to the second energy state to adjust the policy 124 of FIG. 1 to increase and/or otherwise improve energy efficiency of the computing system 102. In some examples, the policy adjustor 212 invokes the energy efficiency policy logic 304 to adjust and/or otherwise transition from the second energy state to the first energy state to adjust the policy 124 of FIG. 1 to decrease and/or otherwise decrease energy efficiency of the computing system 102.

In some examples, the policy adjustor 212 obtains the model output(s) 216 and determines whether to invoke the system performance policy logic 302 or the energy efficiency policy logic 304 based on the model output(s) 216. In some examples, the policy adjustor 212 transitions from the energy efficiency policy logic 304 to the system performance policy logic 302 based on at least one of a first example equation or a second example equation as described below:

$$P(\text{Low Battery Capacity for Usage Classification}) < \text{LowBat}E2P \quad \text{Equation (1)}$$

$$\text{Change in Battery Capacity for Usage Classification} < \text{BatCap}E2P \quad \text{Equation (2)}$$

The examples of Equation (1) and Equation (2) above represent example logic executed by the policy adjustor 212. In the example of Equation (1) above, P(Low Battery Capacity for Usage Classification) is an example low battery capacity probability that represents a likelihood whether the computing system 102 is to operate in a low battery capacity state for a given or specified usage classification, such as when the power source 118 has a battery capacity less than a battery capacity threshold (e.g., a battery capacity threshold of 5%, 15%, 25%, etc.). In the example of Equation (1) above, LowBatE2P is a low battery capacity probability threshold defined in the policy setting(s) 214 of FIG. 2. For example, LowBatE2P corresponds to a probability threshold that the computing system 102 is to operate in the low battery capacity in response to the computing system 102 transitioning from an energy efficiency state (E) to a system performance state (P).

In the example of Equation (2) above, the term "Change in Battery Capacity for Usage Classification" corresponds to a predicted, estimated, and/or otherwise determined change (e.g., a percentage change) in the battery capacity of the power source 118 based on a usage classification after a time period (e.g., a minute, a hour, a day, etc.) has elapsed and/or otherwise occurred. In the example of Equation (2) above, BatCapE2P is a battery capacity change threshold defined in the policy setting(s) 214 of FIG. 2. For example, BatCapE2P corresponds to a threshold representative of a change in the battery capacity in response to the computing system 102 transitioning from an energy efficiency state (E) to a system performance state (P).

In some examples, the policy adjustor 212 invokes the system performance policy logic 302 in response to at least one of Equation (1) or Equation (2) above being satisfied. For example, the policy adjustor 212 invokes the system performance policy logic 302 in response to at least one of (1) a first probability value (e.g., a first low battery capacity probability value, a first P(Low Battery Capacity for Usage Classification), etc.) satisfying a probability threshold (e.g., a low battery probability threshold, a low battery capacity probability threshold, LowBatE2P, etc.) based on the first probability value being less than the probability threshold or (2) a change in battery capacity in response to transitioning from an energy efficient policy to an improved performance policy (e.g., Change in Battery Capacity for Usage Classification) satisfying a battery capacity threshold (e.g., BatCapE2P) based on the change being less than the battery capacity threshold. In such examples, the probability threshold, the battery capacity threshold, etc., is included in the policy setting data 218 retrieved from the policy setting(s) 214, adjusted by a user by executing an instruction or command with the user interface 126 of FIG. 1, etc. Advantageously, in some examples, the system performance policy logic 302 increases performance of the computing system 102 in response to determining that the first probability value satisfying the probability threshold is indicative of a low likelihood of low battery.

In some examples, in response to invoking the system performance policy logic 302 based on satisfying at least one of the probability threshold or the battery capacity threshold as described above, the system performance policy logic 302 determines which of the performance states 312 to which the computing system 102 is to transition. For example, the system performance policy logic 302 selects the first performance state. In such examples, the system performance policy logic 302 compares the adjustments indicated by transitioning the computing system 102 to the first performance state to the policy rewards included in the policy reward output(s) 310.

In some examples, the system performance policy logic 302 determines whether executing the adjustments indicated by the first performance state causes a threshold, such as the battery capacity threshold, to no longer be satisfied. For example, if the battery capacity threshold is 40%, the system performance policy logic 302 determines to select the third performance state (e.g., PERFORMANCE STATE 2) in response to determining that the policy reward(s) for transitioning to the third performance state does not cause the battery capacity to decrease below the battery capacity threshold of 40%. In other examples, if the battery capacity threshold is 40%, the system performance policy logic 302 determines not to select the third performance state in response to determining that the policy reward(s) for transitioning to the third performance state causes the battery capacity to decrease below the battery capacity threshold of 40% and, thus, causes the battery capacity threshold to no longer be satisfied. In such examples, the system performance policy logic 302 selects the first performance state, the second performance state, etc., to ensure that the battery capacity threshold is satisfied by transitioning to such a performance state.

In some examples, the policy adjustor 212 transitions from the system performance policy logic 302 to the energy efficiency policy logic 304 based on at least one of a third example equation or a fourth example equation as described below:

$$P(\text{Low Battery Capacity for Usage Classification}) \geq \text{LowBat}P2E \quad \text{Equation (3)}$$

$$\text{Change in Battery Capacity for Usage Classification} \geq \text{BatCap}P2E \quad \text{Equation (4)}$$

The examples of Equation (3) and Equation (4) above represent example logic executed by the policy adjustor 212. In the example of Equation (3) above, LowBatP2E is a low battery capacity probability threshold defined in the policy setting(s) 214 of FIG. 2. For example, LowBatP2E corresponds to a probability threshold that the computing system 102 is to operate in the low battery capacity in response to the computing system 102 transitioning from a system performance state (P) to an energy efficiency state (E). In the example of Equation (4) above, BatCapP2E is a battery capacity change threshold defined in the policy setting(s) 214 of FIG. 2. For example, BatCapP2E corresponds to a threshold representative of a change in the battery capacity in response to the computing system 102 transitioning from a system performance state (P) to an energy efficiency state (E).

In some examples, the policy adjustor 212 invokes the energy efficiency policy logic 304 in response to at least one of Equation (3) or Equation (4) above being satisfied. For example, the policy adjustor 212 invokes the energy efficiency policy logic 304 in response to at least one of (1) a second probability value (e.g., a second low battery capacity probability value, a second P(Low Battery Capacity for Usage Classification), etc.) satisfying a probability threshold (e.g., a low battery probability threshold, a low battery capacity probability threshold, LowBatE2P, etc.) based on the second probability value being greater than or equal to the probability threshold or (2) a change in battery capacity in response to transitioning from an improved performance policy to an energy efficient policy (e.g., Change in Battery Capacity for Usage Classification) satisfying a battery capacity threshold (e.g., BatCapP2E) based on the change being greater than or equal to the battery capacity threshold. In such examples, the probability threshold, the battery capacity threshold, etc., are included in the policy setting data 218, adjusted by a user by executing an instruction or command with the user interface 126 of FIG. 1, etc.

In some examples, in response to invoking the energy efficiency policy logic 304 based on satisfying the logic relationships in at least one of Equation (3) or Equation (4) above, the energy efficiency policy logic 304 determines in which of the energy states 314 the computing system 102 is to be instructed to operate. For example, the energy efficiency policy logic 304 selects the first energy state. In such examples, the energy efficiency policy logic 304 compares the adjustments indicated by transitioning the computing system 102 to the first energy state to the policy rewards included in the policy reward output(s) 310 to determine whether the battery capacity threshold becomes satisfied. In such examples, the energy efficiency policy logic 304 selects the first energy state in response to the battery capacity threshold becoming satisfied in response to the adjustments indicated by the policy rewards.

In some examples, the energy efficiency policy logic 304 determines whether executing the adjustments indicated by the first energy state causes a threshold, such as the battery capacity threshold, to be satisfied. For example, if the battery capacity threshold is 20%, the energy efficiency policy logic 304 determines to select the third energy state (e.g., ENERGY STATE 2) in response to determining that the policy reward(s) for transitioning to the third energy state do not cause the battery capacity to decrease below the battery capacity threshold of 20%. In other examples, if the battery capacity threshold is 20%, the energy efficiency policy logic 304 determines not to select the third energy state in response to determining that the policy reward(s) for transitioning to the third energy state causes the battery capacity to decrease below the battery capacity threshold of 20%. In such examples, the system performance policy logic 302 selects the first energy state, the second energy state, etc., to ensure that the battery capacity threshold is satisfied by transitioning to such an energy state.

In some examples, the policy adjustor 212 transitions to the system performance policy logic 302 after or subsequent to invoking the energy efficiency policy logic 304 (e.g., invoking the energy efficient policy logic 304 in response to at least one of Equation (3) or Equation (4) above being satisfied). For example, the policy adjustor 212 determines at a first time that the usage classification of the computing system 102 is a first usage classification representative of heavy usage and the probability is a first probability representative of a user having relatively low low-battery anxiety. In such examples, the policy adjustor 212 determines at a second time after the first time that the user has relatively high low-battery anxiety based on the telemetry data 122 indicative of the user not allowing the power source 118 to fall below a low battery capacity threshold and, instead, charges the power source 118 prior to the computing system 102 abruptly turning off due to low battery. In such examples, the policy adjustor 212 determines that the usage classification of the computing system 102 is a second usage classification representative of heavy usage and the probability is a second probability representative of the user having relatively high low-battery anxiety. In some such examples, in response to determining at least one of the second usage classification or the second probability, the policy adjustor 212 transitions from the energy efficiency logic 304 to the system performance policy logic 302 to improve system performance of the computing system 102. Advantageously, by executing one or more AI/ML models, the policy adjustor 212 learns and/or otherwise determines over a time period a corresponding usage classification, a low battery probability, etc., and/or a combination thereof, that is associated with usage of the computing system 102.

Flowcharts representative of example hardware logic, machine readable instructions, hardware implemented state machines, and/or any combination thereof for implementing the example power policy controller 104A-B of FIGS. 1 and/or 2 are shown in FIGS. 4-7. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4-7, many other methods of implementing the example power policy controller 104A-B may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPLD, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), SQL, Swift, etc.

As mentioned above, the example processes of FIGS. 4-9 may be implemented using executable instructions (e.g., computer and/or machine readable instructions) stored on a non-transitory computer and/or machine readable medium such as a hard disk drive, a flash memory, a read-only memory, a CD, a DVD, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 4:
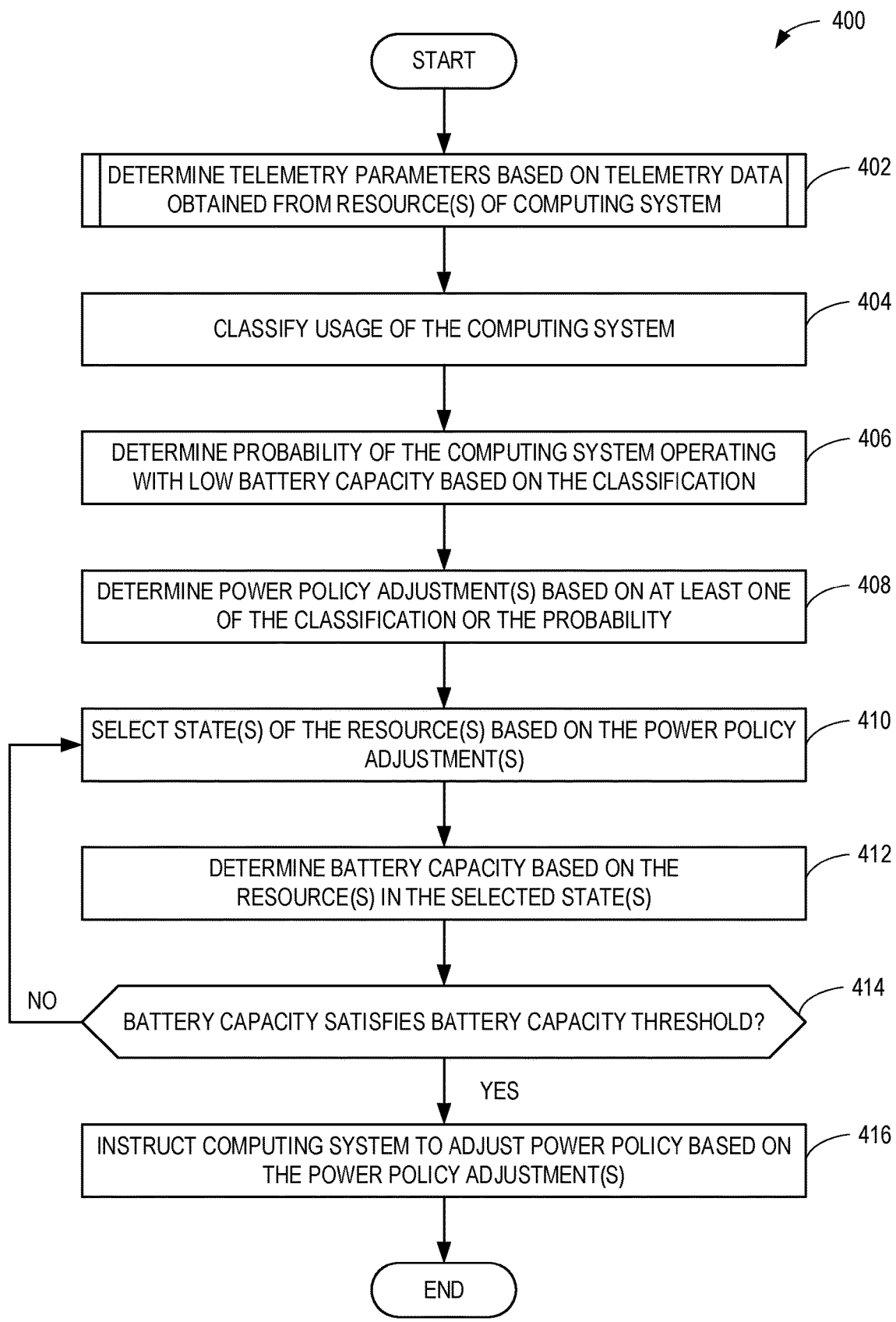
FIG. 4 is a flowchart representative of example machine readable instructions that may be executed to implement the example power policy controller of FIGS. 1 and/or 2 to instruct the example computing system of FIG. 1 to adjust an example power policy based on example power policy adjustment(s).

FIG. 4 is a flowchart representative of example machine readable instructions 400 that may be executed to implement the example power policy controller 104A-B of FIGS. 1 and/or 2 to instruct the example computing system 102 of FIG. 1 to adjust the example policy 124 of FIG. 1 based on example power policy adjustment(s).

The machine readable instructions 400 of FIG. 4 begin at block 402, at which the power policy controller 104A-B determines telemetry parameters based on telemetry data obtained from resource(s) of a computing system. For example, the policy controller interface 202 (FIG. 2) obtains the telemetry data 122 of FIGS. 1 and/or 2 from one or more resources, such as the CPU 106, the first acceleration resource 108, the second acceleration resource 110, the general purpose processing resource 112, the interface resource 114, the power source 118, the database 120, and/or, more generally, the computing system 102 (e.g., hardware, software, and/or firmware associated with the computing system 102). In such examples, the policy controller interface 202 determines telemetry parameters, such as a utilization of one(s) of the resource(s), a battery capacity of the power source 118, an identification of one or more processes or services executed by one(s) of the resource(s), etc., based on the telemetry data 122. Alternatively, the usage classifier 206, the low battery probability determiner 208, the policy reward determiner 210, and/or, more generally, the policy model executor 204 of FIG. 2 determines the telemetry parameters based on the telemetry data 122. An example process that may be executed to implement block 402 is described below in connection with FIG. 5.

At block 404, the power policy controller 104A-B classifies usage of the computing system. For example, the usage classifier 206 (FIG. 2) executes one or more AI/ML models to classify and/or otherwise characterize the usage of the computing system 102 as a first usage classification indicative of a first level of resource demand, a second usage classification indicative of a second level of resource demand, etc. In such examples, the usage classifier 206 classifies a user associated with the first usage classification, the second usage classification, etc., as having a relatively low level of low-battery anxiety, a relatively high level of low-battery anxiety, etc.

At block 406, the power policy controller 104A-B determines a probability of the computing system operating with low battery capacity based on the classification. For example, the low battery probability determiner 208 (FIG. 2) executes one or more AI/ML models to determine a probability representative of a likelihood that the computing system 102 is to operate and/or otherwise execute computing task(s) when the power source 118 is in a low battery state (e.g., a battery capacity of the power source 118 satisfies a low-battery capacity threshold). In such examples, the low battery probability determiner 208 determines the probability based on the classification of the usage of the computing system 102.

At block 408, the power policy controller 104A-B determines power policy adjustment(s) based on at least one of the classification or the probability. For example, the policy reward determiner 210 (FIG. 2) determines one or more power policy adjustments to the policy 124 of FIG. 1 based on at least one of the classification or the probability. In such examples, in response to determining that the classification is representative of a relatively high or heavy demand on resources (e.g., content creation tasks, graphics generation, etc.), the policy reward determiner 210 determines first power policy adjustments to increase system performance to accommodate the demand on the resources, second power policy adjustments to increase energy efficiency of the system to extend battery life, etc., and/or a combination thereof. In some such examples, the policy reward determiner 210 determines and/or otherwise assign a policy reward in response to implementing one or more of the first power policy adjustments, one or more of the second power policy adjustments, etc., and/or a combination thereof.

At block 410, the power policy controller 104A-B selects state(s) of the resource(s) based on the power policy adjustment(s). For example, the policy adjustor 212 (FIG. 2) determines to invoke the system performance policy logic 302 (FIG. 3) to improve performance at the expense of energy efficiency based on the power policy adjustment(s). In such examples, the policy adjustor 212 maps the power policy adjustment(s) to the first performance state of the performance states 312 for one or more of the resources. In other examples, the policy adjustor 212 determines to invoke the energy efficiency policy logic 304 (FIG. 3) to improve energy efficiency at the expense of performance based on the power policy adjustment(s). In such examples, the policy adjustor 212 maps the power policy adjustment(s) to the first energy state of the energy states 314 for one or more of the resources.

At block 412, the power policy controller 104A-B determines a battery capacity based on the resource(s) in the selected state(s). For example, the policy adjustor 212 determines a battery capacity of the power source 118 in response to instructing one(s) of the resource(s) to transition to the selected state, such as the first performance state.

At block 414, the power policy controller 104A-B determines whether the battery capacity satisfies a battery capacity threshold. For example, the policy adjustor 212 predicts that the power source 118 has a first battery capacity of 40% after a time period in response to one(s) of the resource(s) executing computing task(s) while in the first performance state. In such examples, the policy adjustor 212 determines that the first battery capacity of 40% satisfies a battery capacity threshold of 20% as defined by the policy setting data 218 from the policy setting(s) 214. In other examples, the policy adjustor 212 predicts that the power source 118 can have a second battery capacity of 10% after the time period in response to one(s) of the resource(s) executing computing task(s) while in the first performance state. In such examples, the policy adjustor 212 determines that the second battery capacity of 10% does not satisfy the battery capacity threshold of 20% as defined by the policy setting data 218.

If, at block 414, the power policy controller 104A-B determines that the battery capacity does not satisfy the battery capacity threshold, control returns to block 410 to select another state(s) of the resource(s) based on the power policy adjustment(s). If, at block 414, the power policy controller 104A-B determines that the battery capacity satisfies the battery capacity threshold, then, at block 416, the power policy controller 104A-B instructs the computing system to adjust a power policy based on the power policy adjustment(s). For example, the policy adjustor 212 generates the policy data 220 (FIG. 2) to instruct the computing system 102 to transition one(s) of the resource(s) to the selected state(s) based on the power policy adjustment(s) to adjust the policy 124. In such examples, the policy controller interface 202 transmits the policy data 220 to an OS implemented by the CPU 106 via the bus 116 (FIGS. 1-2), a firmware of the first acceleration resource 108, etc., and/or a combination thereof. In response to instructing the computing system to adjust the power policy based on the power policy adjustment(s) at block 416, the example machine readable instructions 400 of FIG. 4 conclude.

Figure 5:
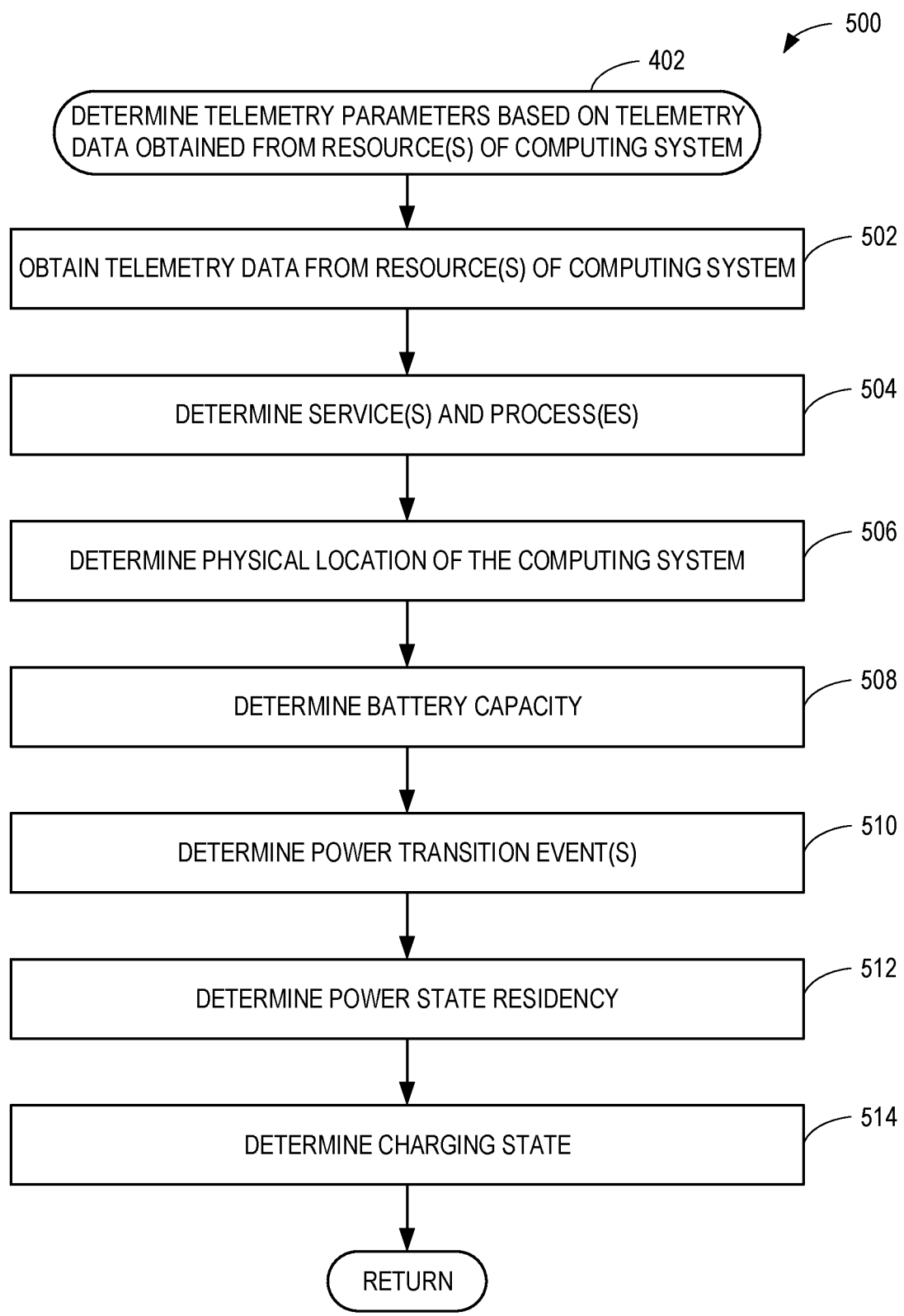
FIG. 5 is a flowchart representative of example machine readable instructions that may be executed to implement the example power policy controller of FIGS. 1 and/or 2 to determine example telemetry parameters based on example telemetry data obtained from example resource(s) of the example computing system of FIG. 1.

FIG. 5 is a flowchart representative of example machine readable instructions 500 that may be executed to implement the example power policy controller 104A-B of FIGS. 1 and/or 2 to determine example telemetry parameters based on the example telemetry data 122 of FIGS. 1 and/or 2 obtained from example resource(s) of the example computing system 102 of FIG. 1. In some examples, the machine readable instructions 500 of FIG. 5 are executed to implement block 402 of the example of FIG. 4.

The example machine readable instructions 500 of FIG. 5 begin at block 502, at which the power policy controller 104A-B obtains telemetry data from resource(s) of a computing system. For example, the policy controller interface 202 (FIG. 2) obtains the telemetry data 122 of FIG. 1 and/or 2 from one or more resources, such as the CPU 106, the first acceleration resource 108, the second acceleration resource 110, the general purpose processing resource 112, the interface resource 114, the power source 118, the database 120, and/or, more generally, the computing system 102 (e.g., hardware, software, and/or firmware associated with the computing system 102).

At block 504, the power policy controller 104A-B determines process(es) and service(s). For example, the policy controller interface 202 (FIG. 2) determines a telemetry parameter representative of a process (e.g., an instance of an executable, an .exe file, etc.), such as an Internet browser, a media player, etc., associated with the CPU 106, the interface resource 114, the power source 118, etc., based on the telemetry data 122. In other examples, the policy controller interface 202 determines a telemetry parameter representative of a service (e.g., a process that executes in the background and does not interact with a desktop or main execution environment), such as a DLL, a utility, etc., of the CPU 106, the first acceleration resource 108, the power source 118, etc., based on the telemetry data 122.

At block 506, the power policy controller 104A-B determines a physical location of the computing system. For example, the policy controller interface 202 determines a telemetry parameter indicative of whether the computing system 102 is in a residential, office, commercial, industrial, etc., location based on network information (e.g., an IP address, an IP port number, router information, etc.) included in the telemetry data 122.

At block 508, the power policy controller 104A-B determines a battery capacity. For example, the policy controller interface 202 determines a telemetry parameter corresponding to a battery capacity of the power source 118 based on the telemetry data 122.

At block 510, the power policy controller 104A-B determines power transition event(s). For example, the policy controller interface 202 determines telemetry parameter(s) representative of an interval, a frequency, etc., at which the power source 118 transitions between being charged (e.g., plugged into a wall outlet) and not being charged (e.g., not being plugged into a wall outlet) based on the telemetry data 122.

At block 512, the power policy controller 104A-B determines a power state residency. For example, the policy controller interface 202 determines a telemetry parameter indicative of a time period (e.g., an average, median, mode, range, etc., of a time period) in which the power source 118 is at a specific battery capacity based on the telemetry data 122. In such examples, the policy controller interface 202 determines that the power source 118 averages 80% of a time period (e.g., an hour, a day, a week, etc.) at 100% battery capacity indicating that the power source 118 is typically coupled to a charging source, 40% of a time period at 20% battery capacity indicating that the power source 118 is not typically coupled to a charging source, etc.

At block 514, the power policy controller 104A-B determines a charging state. For example, the policy controller interface 202 determines a telemetry parameter indicative of the computing system 102 being powered by a limited-energy source, such as the power source 118 when the power source 118 is not being charged, an unlimited-energy source, such as the power source 118 when the power source 118 is being charged by a wall outlet, etc. In response to determining the charging state at block 514, control returns to block 404 of the example machine readable instructions 400 of FIG. 4 to classify a usage of the computing system.

Figure 6:
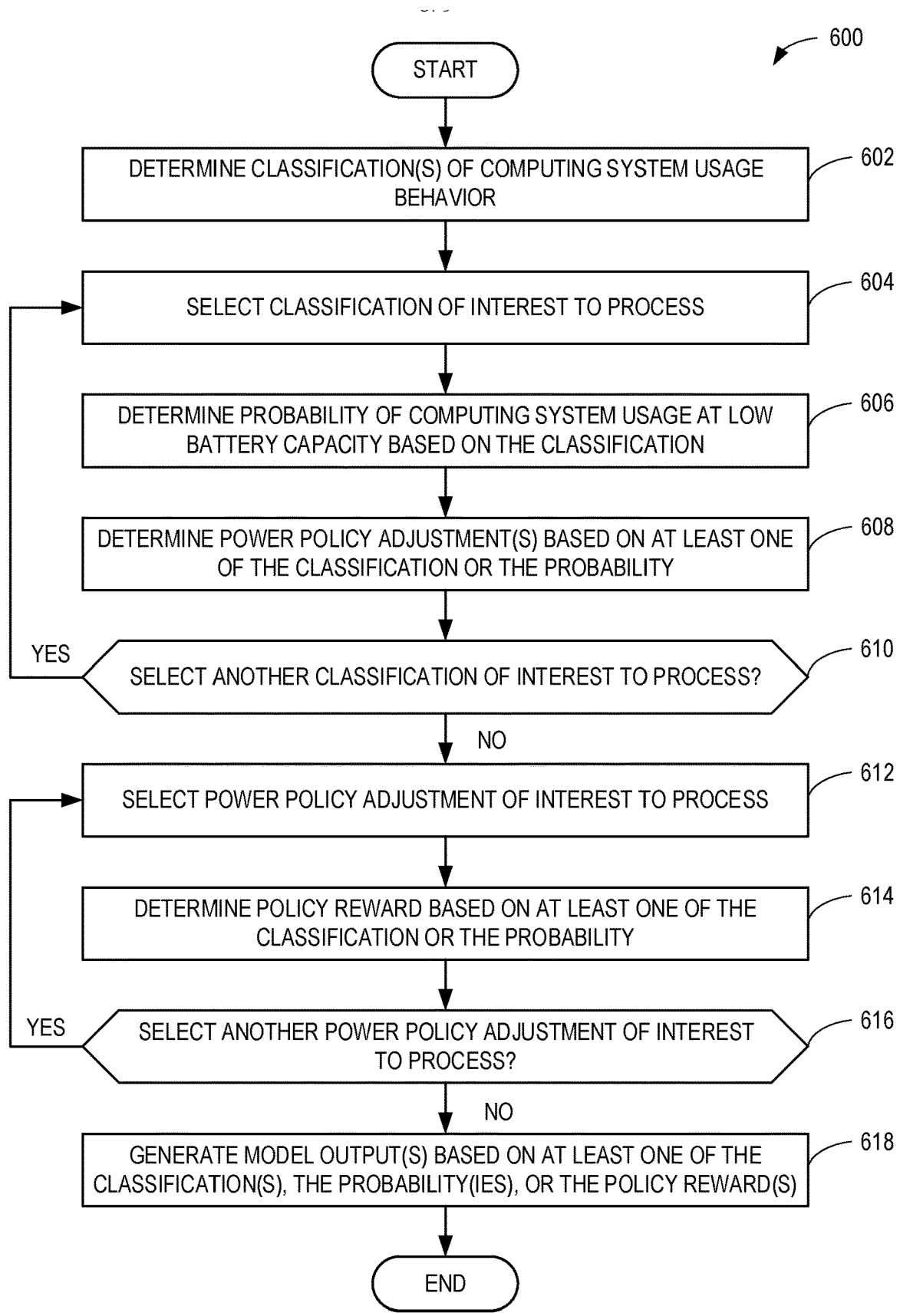
FIG. 6 is a flowchart representative of example machine readable instructions that may be executed to implement the example power policy controller of FIGS. 1 and/or 2 to determine example power policy adjustment(s) based on example output(s) from one or more example models.

FIG. 6 is a flowchart representative of example machine readable instructions 600 that may be executed to implement the example power policy controller 104A-B of FIGS. 1 and/or 2 to determine example power policy adjustment(s) based on the example model output(s) 216 from one or more example AL/MI models, such as the example usage classifier 206, the example low battery probability determiner 208, and/or the policy reward determiner 210 of the example of FIG. 2. The example machine readable instructions 600 of FIG. 6 begin at block 602, at which the power policy controller 104A-B determines classification(s) of computing system usage behavior. For example, the usage classifier 206 (FIG. 2) determines a first usage classification, a second usage classification, etc., of usage of the computing system 102 based on the telemetry data 122.

At block 604, the power policy controller 104A-B selects a classification of interest to process. For example, the usage classifier 206 selects the first usage classification to process.

At block 606, the power policy controller 104A-B determines a probability of computing system usage at a low battery capacity based on the classification. For example, the low battery probability determiner 208 (FIG. 2) determines a first probability value representative of a likelihood that a user of the computing system 102 is to operate the computing system with the power source 118 having a battery capacity that satisfies a low-battery capacity threshold (e.g., 5% battery capacity, 15% battery capacity, 25% battery capacity, etc.).

At block 608, the power policy controller 104A-B determines power policy adjustment(s) based on at least one of the classification or the probability. For example, the policy reward determiner 210 (FIG. 2) determines a first power policy adjustment to adjust power delivery to an antenna (e.g., a Wi-Fi antenna, a Bluetooth antenna, etc.) of the interface resource 114, a second power policy adjustment to adjust clock frequency or cycle of a resource, a third power policy adjustment to adjust a software interrupt generation interval, etc. In such examples, the policy reward determiner 210 determines the first power policy adjustment to be a reduction in power delivery to the antenna in response to at least one of the first usage classification being representative of a heavy demand for resource(s) or the first probability value indicative of the user likely to allow the battery capacity of the power source 118 to fall below the low battery capacity threshold. In other examples, the policy reward determiner 210 determines the first power policy adjustment to be an increase in power delivery to the antenna in response to at least one of the first usage classification being representative of a light demand for resource(s) or the first probability value indicative of the user unlikely to allow the battery capacity of the power source 118 to fall below the low battery capacity threshold.

At block 610, the power policy controller 104A-B determines whether to select another classification of interest to process. For example, the usage classifier 206 determines to select the second usage classification to process. If, at block 610, the power policy controller 104A-B determines to select another classification of interest to process, control returns to block 604 to select another classification of interest to process. If, at block 610, the power policy controller 104A-B determines not to select another classification of interest to process, then, at block 612, the power policy controller 104A-B selects a power policy adjustment of interest to process. For example, the policy reward determiner 210 selects the first power policy adjustment to process.

At block 614, the power policy controller 104A-B determines a policy reward based on at least one of the classification or the probability. For example, the policy reward determiner 210 determines a first policy reward corresponding to the first power policy adjustment of increasing power delivery to the antenna of the interface resource 114. In such examples, the policy reward determiner 210 determines the first policy reward to be relatively high in response to at least one of the first usage classification to be representative of heavy demand on the resource(s) or the first probability value being representative of a high likelihood that a user is to operate the computing system 102 in a low-battery state (e.g., the user has relatively low low-battery anxiety). For example, the first policy reward can be relatively high because the first power policy adjustment can extend battery life and/or otherwise mitigate the likelihood of the computing system 102 abruptly turning off due to low battery.

In other examples, the policy reward determiner 210 determines the first policy reward corresponding to the first power policy adjustment of decreasing power delivery to the antenna of the interface resource 114. In such examples, the policy reward determiner 210 determines the first policy reward to be relatively low in response to at least one of the first usage classification to be representative of heavy demand on the resource(s) or the first probability value being representative of a low likelihood that a user is to operate the computing system 102 in a low-battery state (e.g., the user has relatively low low-battery anxiety). Advantageously, in some examples, the policy reward determiner 210 determines that system performance can be improved and/or otherwise maintained at a relatively high level in response to determining that the likelihood of the computing system 102 operating in a low battery state is relatively low regardless of whether the usage of the computing system 102 is representative of a heavy demand on the resource(s).

At block 616, the power policy controller 104A-B determines whether to select another power policy adjustment of interest to process. For example, the policy reward determiner 210 determines to select the second power policy adjustment to process. If, at block 616, the power policy controller 104A-B determines to select another power policy adjustment of interest to process, control returns to block 612 to select another power policy adjustment of interest to process.

If, at block 616, the power policy controller 104A-B determines not to select another power policy adjustment of interest to process, then, at block 618, the power policy controller 104A-B generates model output(s) based on at least one of the classification(s), the one or more probabilities, or the policy reward(s). For example, the usage classifier 206, the low battery probability determiner 208, the policy reward determiner 210, and/or, more generally, the policy model executor 204 of FIG. 2, generates the model output(s) 216 to include at least one of the usage classification output(s) 306 (FIG. 3), the low battery probability output(s) 308 (FIG. 3), or the policy reward output(s) 310 (FIG. 3). In response to generating the model output(s) based on at least one of the classification(s), the one or more probabilities, or the policy reward(s) at block 618, the example machine readable instructions 600 of FIG. 6 conclude.

Figure 7:
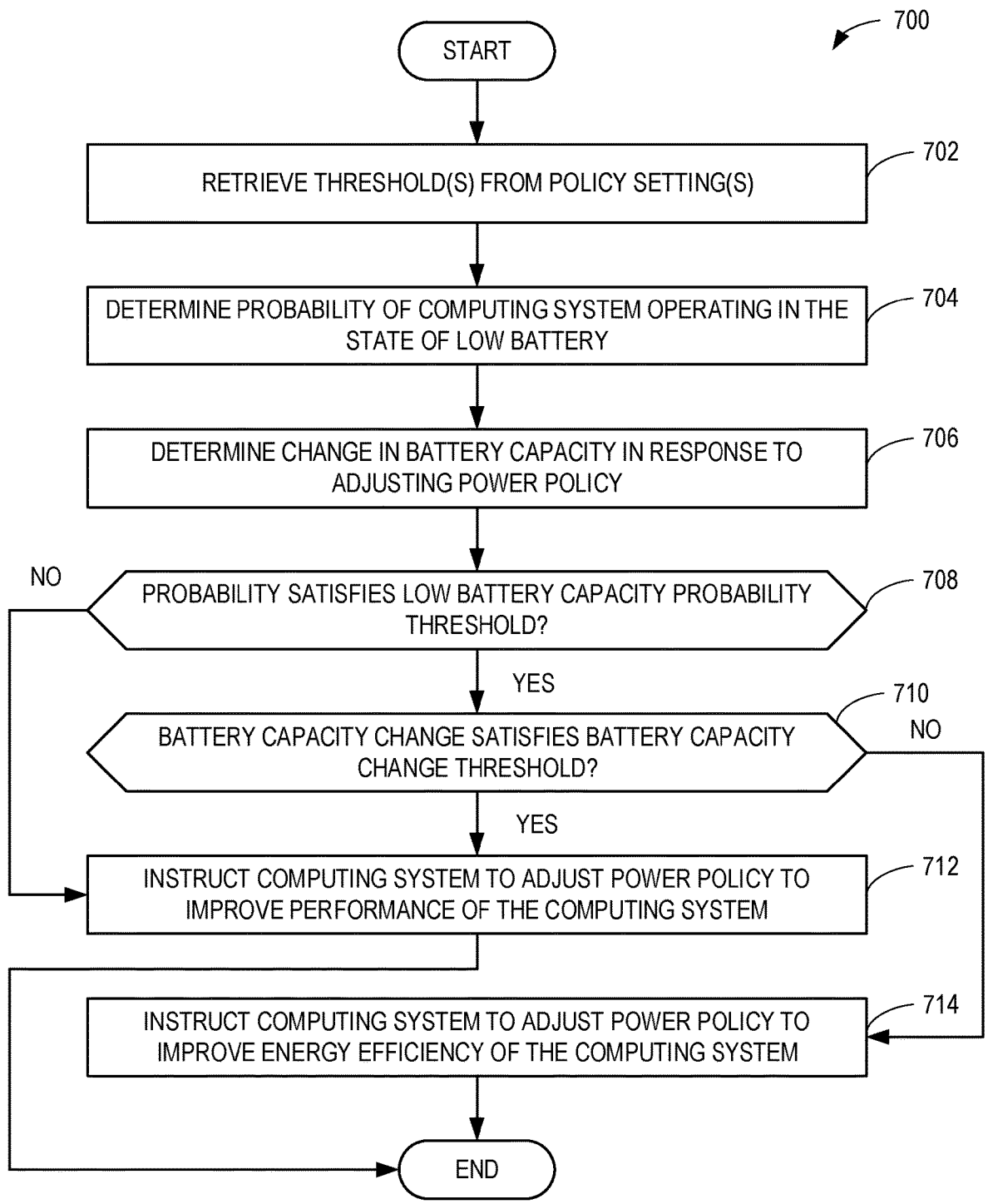
FIG. 7 is a flowchart representative of example machine readable instructions that may be executed to implement the example power policy controller of FIGS. 1 and/or 2 to instruct the example computing system of FIG. 1 to adjust an example power policy.

FIG. 7 is a flowchart representative of example machine readable instructions 700 that may be executed to implement the example power policy controller 104A-B of FIGS. 1 and/or 2 to instruct the example computing system 100 of FIG. 1 to adjust the example policy 124 of FIG. 1. The example machine readable instructions 700 of FIG. 7 begin at block 702, at which the power policy controller 104A-B retrieves threshold(s) from policy setting(s). For example, the policy adjustor 212 (FIG. 2) retrieves a probability threshold (e.g., a low battery capacity probability threshold), a battery capacity threshold (e.g., a low-battery capacity threshold), etc., from the policy setting(s) 214 (FIG. 2).

At block 704, the power policy controller 104A-B determines a probability of the computing system operating in the state of low battery. For example, the policy adjustor 212 extracts a first probability value from the low battery probability output(s) 308 (FIG. 3) that is indicative of whether a user associated with the computing system 102 is likely to operate the computing system 102 in a state of low battery.

At block 706, the power policy controller 104A-B determines a change in battery capacity in response to adjusting a power policy. For example, the policy adjustor 212 predicts, estimates, and/or otherwise determines a change in the battery capacity of the power source 118 in response to adjusting the policy 124.

At block 708, the power policy controller 104A-B determines whether the probability satisfies a low battery capacity probability threshold. For example, the policy adjustor 212 determines that the first probability value satisfies the probability threshold based on the first probability value being greater than the probability threshold. In such examples, the policy adjustor 212 determines that the computing system 102 is likely to be operated with the power source 118 having low battery based on the first probability value being greater than the probability threshold and, thus, satisfies the probability threshold.

If, at block 708, the power policy controller 104A-B determines that the probability does not satisfy the low battery capacity probability threshold, control proceeds to block 712 to instruct the computing system to adjust the power policy to improve performance of the computing system. If, at block 708, the power policy controller 104A-B determines that the probability satisfies the low battery capacity probability threshold, then, at block 710, the power policy controller 104A-B determines whether the battery capacity change satisfies a battery change threshold. For example, the policy adjustor 212 determines that the battery capacity of the power source 118 can change from 50% to 35% in response to adjusting the policy 124. In such examples, the policy adjustor 212 determines that the battery capacity change of 15% satisfies a battery change threshold of 20% based on the battery capacity change being less than the battery change threshold. In other examples, the policy adjustor 212 determines that the battery capacity of 35% satisfies a battery capacity threshold of 20% based on the battery capacity of 35% being greater than the battery capacity threshold of 20%.

If, at block 710, the power policy controller 104A-B determines that the battery capacity change does not satisfy the battery capacity change threshold, control proceeds to block 714 to instruct the computing system to adjust the power policy to improve energy efficiency of the computing system. For example, the policy adjustor 212 invokes the energy efficiency policy logic 304 (FIG. 3) to select one of the energy states 314 to improve energy efficiency of the computing system 102. In response to instructing the computing system to adjust the power policy to improve energy efficiency of the computing system at block 712, the example machine readable instructions 700 of FIG. 7 conclude.

If, at block 710, the power policy controller 104A-B determines that the battery capacity change satisfies the battery capacity change threshold, then, at block 712, the power policy controller 104A-B instructs the computing system to adjust the power policy to improve performance of the computing system. For example, the policy adjustor 212 invokes the system performance policy logic 302 (FIG. 3) to select one of the performance states 312 to improve performance of the computing system 102. In response to instructing the computing system to adjust the power policy to improve system performance of the computing system at block 710, the example machine readable instructions 700 of FIG. 7 conclude.

Figure 8:
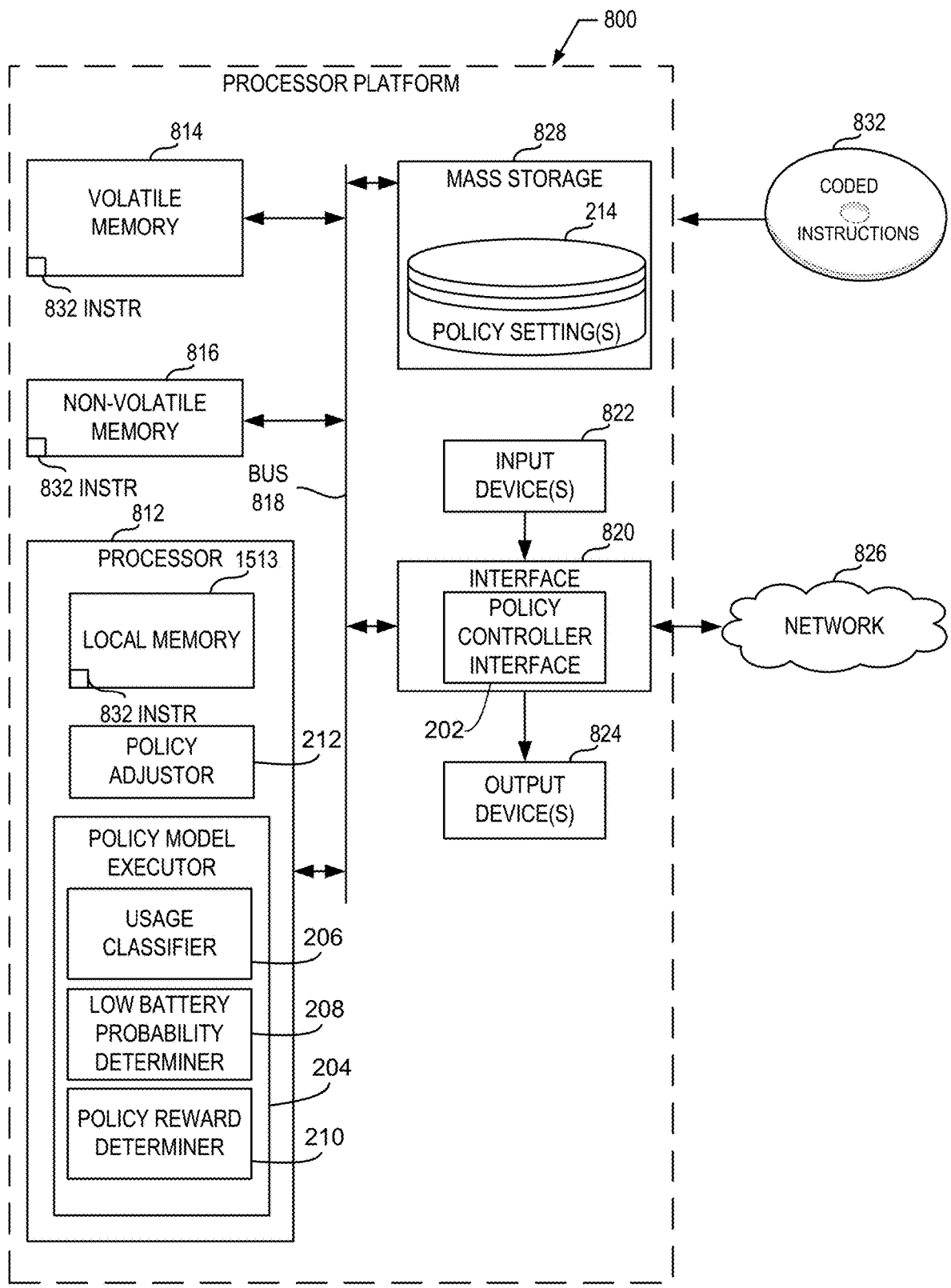
FIG. 8 is a block diagram of an example processing platform structured to execute the example machine readable instructions of FIGS. 4-7 to implement the example power policy controller of FIGS. 1 and/or 2.

FIG. 8 is a block diagram of an example processor platform 800 structured to execute the instructions of FIGS. 4-7 to implement the example power policy controller 104A-B of FIGS. 1 and/or 2. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements the example policy model executor 204, the example usage classifier 206, the example low battery probability determiner 208, and the example policy reward determiner 210 of FIG. 2.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface. In this example, the interface circuit 820 implements the example policy controller interface 202 of FIG. 2.

In the illustrated example, one or more input devices 822 are connected to the interface circuit 820. The input device(s) 822 permit(s) a user to enter data and/or commands into the processor 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and DVD drives. In this example, the one or more mass storage devices 828 implement the policy setting(s) 214 of FIG. 2.

The machine executable instructions 832 of FIGS. 4-7 may be stored in the mass storage device 828, in the volatile memory 814, in the non-volatile memory 816, and/or on a removable non-transitory computer readable storage medium such as a CD or DVD.

Figure 9:
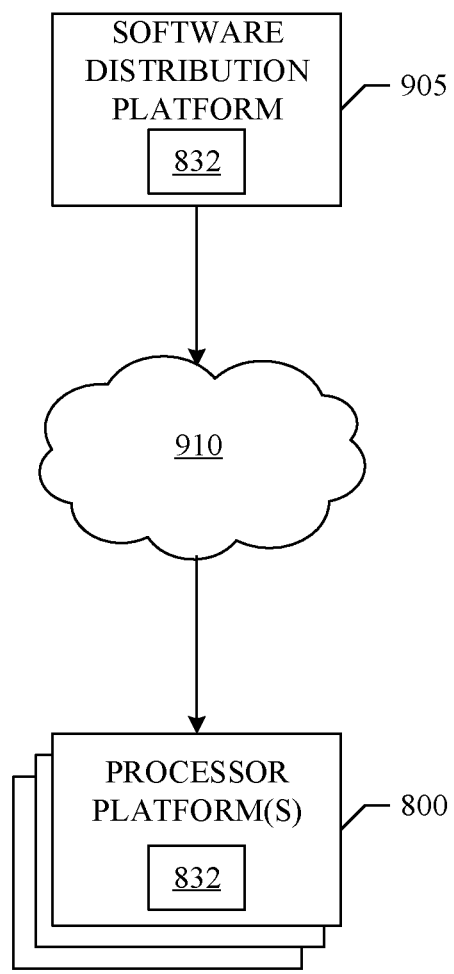
FIG. 9 is a block diagram of an example software distribution platform to distribute software (e.g., software corresponding to the example computer readable instructions of FIGS. 4-7) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 905 to distribute software such as the example computer readable instructions 832 of FIG. 8 to third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 832 of FIG. 8. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the computer readable instructions 832, which may correspond to the example computer readable instructions 400, 500, 600, 700 of FIGS. 4-7, as described above. The one or more servers of the example software distribution platform 905 are in communication with a network 910, which may correspond to any one or more of the Internet and/or any of the example networks 128, 826 described above in connection with FIGS. 1 and/or 8. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 832 from the software distribution platform 905. For example, the software, which may correspond to the example computer readable instructions 400, 500, 600, 700 of FIGS. 4-7, may be downloaded to the example processor platform 800, which is to execute the computer readable instructions 832 to implement the example power policy controller 104A-B of FIGS. 1 and/or 2. In some examples, one or more servers of the software distribution platform 905 periodically offer, transmit, and/or force updates to the software (e.g., the example computer readable instructions 832 of FIG. 8) to ensure improvements, patches, updates, etc. are distributed and applied to the software at the end user devices.

From the foregoing, it will be appreciated that example systems, methods, apparatus, and articles of manufacture have been disclosed that improve power management of computing devices and/or systems. The disclosed systems, methods, apparatus, and articles of manufacture improve the efficiency of using a computing device by classifying a usage of a computing device and adapting (e.g., autonomously adapting, automatically adapting, etc.) a power policy of the computing device to maximize and/or otherwise improve system performance while minimizing and/or otherwise reducing a likelihood that a user will feel low battery anxiety. Advantageously, the disclosed systems, methods, apparatus, and articles of manufacture improve performance of a computing system in response to determining that a likelihood that the computing system is to operate in a low battery state is unlikely. The disclosed methods, apparatus and articles of manufacture are accordingly directed to one or more improvement(s) in the functioning of a computer.

Example methods, apparatus, systems, and articles of manufacture to improve computing device power management are disclosed herein. Further examples and combinations thereof include the following:

Example 1 includes an apparatus for device power management, the apparatus comprising a usage classifier to classify usage of a computing system, a low battery probability determiner to determine a probability of the computing system operating with a low battery capacity based on the classification, a policy reward determiner to determine an adjustment of a policy based on at least one of the classification or the probability, and determine a battery capacity of the computing system in response to the adjustment, and a policy adjustor to adjust the policy in response to the battery capacity satisfying a threshold.

Example 2 includes the apparatus of example 1, further including an interface to determine a telemetry parameter based on telemetry data obtained from the computing system, the telemetry parameter based on at least one of a location, a process, a power transition event, or a power source associated with the computing system.

Example 3 includes the apparatus of example 1, wherein the policy is a first policy, and the policy adjustor is to adjust the first policy to a second policy in response to the probability satisfying a low battery probability threshold, the first policy to improve performance of the computing system, the second policy to improve energy efficiency of the computing system.

Example 4 includes the apparatus of example 1, wherein the policy is a first policy, and the policy adjustor is to adjust the first policy to a second policy in response to the probability not satisfying a low battery probability threshold, the first policy to improve energy efficiency of the computing system, the second policy to improve performance of the computing system.

Example 5 includes the apparatus of example 1, wherein the policy is representative of improving performance of the computing system, and the policy adjustor is to adjust the policy by at least one of increasing a first frequency associated with a hardware resource, increasing a second frequency associated with a software resource, or increasing power delivery to an antenna.

Example 6 includes the apparatus of example 1, wherein the adjustment includes at least one of adjusting a first frequency associated with a hardware resource, a second frequency associated with a software resource, or power delivery to an antenna.

Example 7 includes the apparatus of example 1, wherein the adjustment is a first adjustment representative of a first state of a hardware resource, and, in response to the battery capacity not satisfying the threshold, the policy adjustor is to determine a second adjustment representative of a second state of the hardware resource, the first state to cause a first energy expenditure greater than a second energy expenditure by the second state.

Example 8 includes a non-transitory computer readable storage device comprising instructions that, when executed, cause a machine to at least classify usage of a computing system, determine a probability of the computing system operating with a low battery capacity based on the classification, determine an adjustment of a policy based on at least one of the classification or the probability, and determine a battery capacity of the computing system in response to the adjustment, and adjust the policy in response to the battery capacity satisfying a threshold.

Example 9 includes the non-transitory computer readable storage device of example 8, wherein the instructions, when executed, cause the machine to determine a telemetry parameter based on telemetry data obtained from the computing system, the telemetry parameter based on at least one of a location, a process, a power transition event, or a power source associated with the computing system.

Example 10 includes the non-transitory computer readable storage device of example 8, wherein the policy is a first policy, and the instructions, when executed, cause the machine to adjust the first policy to a second policy in response to the probability satisfying a low battery probability threshold, the first policy to improve performance of the computing system, the second policy to improve energy efficiency of the computing system.

Example 11 includes the non-transitory computer readable storage device of example 8, wherein the policy is a first policy, and the instructions, when executed, cause the machine to adjust the first policy to a second policy in response to the probability not satisfying a low battery probability threshold, the first policy to improve energy efficiency of the computing system, the second policy to improve performance of the computing system.

Example 12 includes the non-transitory computer readable storage device of example 8, wherein the policy is representative of improving performance of the computing system, and the instructions, when executed, cause the machine to adjust the policy by at least one of increasing a first frequency associated with a hardware resource, increasing a second frequency associated with a software resource, or increasing power delivery to an antenna.

Example 13 includes the non-transitory computer readable storage device of example 8, wherein the instructions, when executed, cause the machine to determine the adjustment to include at least one of adjusting a first frequency associated with a hardware resource, a second frequency associated with a software resource, or power delivery to an antenna.

Example 14 includes the non-transitory computer readable storage device of example 8, wherein the adjustment is a first adjustment representative of a first state of a hardware resource, and the instructions, when executed, cause the machine to, in response to the battery capacity not satisfying the threshold, determine a second adjustment representative of a second state of the hardware resource, the first state to cause a first energy expenditure greater than a second energy expenditure by the second state.

Example 15 includes an apparatus for device power management, the apparatus comprising means for classifying usage of a computing system, means for determining a probability of the computing system operating with a low battery capacity based on the classification, means for identifying an adjustment of a policy based on at least one of the classification or the probability, and means for predicting a battery capacity of the computing system in response to the adjustment, and means for adjusting the policy in response to the battery capacity satisfying a threshold.

Example 16 includes the apparatus of example 15, wherein the means for determining is first means for determining, and further including second means for determining a telemetry parameter based on telemetry data obtained from the computing system, the telemetry parameter based on at least one of a location, a process, a power transition event, or a power source associated with the computing system.

Example 17 includes the apparatus of example 15, wherein the policy is a first policy, and the means for adjusting is to adjust the first policy to a second policy in response to the probability satisfying a low battery probability threshold, the first policy to improve performance of the computing system, the second policy to improve energy efficiency of the computing system.

Example 18 includes the apparatus of example 15, wherein the policy is a first policy, and the means for adjusting is to adjust the first policy to a second policy in response to the probability not satisfying a low battery probability threshold, the first policy to improve energy efficiency of the computing system, the second policy to improve performance of the computing system.

Example 19 includes the apparatus of example 15, wherein the policy is representative of improving performance of the computing system, and the means for adjusting is to adjust the policy by at least one of increasing a first frequency associated with a hardware resource, increasing a second frequency associated with a software resource, or increasing power delivery to an antenna.

Example 20 includes the apparatus of example 15, wherein the adjustment includes at least one of adjusting a first frequency associated with a hardware resource, a second frequency associated with a software resource, or power delivery to an antenna.

Example 21 includes the apparatus of example 15, wherein the adjustment is a first adjustment representative of a first state of a hardware resource, and, in response to the battery capacity not satisfying the threshold, the means for adjusting is to determine a second adjustment representative of a second state of the hardware resource, the first state to cause a first energy expenditure greater than a second energy expenditure by the second state.

Example 22 includes a method for device power management, the method comprising classifying usage of a computing system, determining a probability of the computing system operating with a low battery capacity based on the classification, determining an adjustment of a policy based on at least one of the classification or the probability, and determining a battery capacity of the computing system in response to the adjustment, and adjusting the policy in response to the battery capacity satisfying a threshold.

Example 23 includes the method of example 22, further including determining a telemetry parameter based on telemetry data obtained from the computing system, the telemetry parameter based on at least one of a location, a process, a power transition event, or a power source associated with the computing system.

Example 24 includes the method of example 22, wherein the policy is a first policy, and adjusting the policy includes adjusting the first policy to a second policy in response to the probability satisfying a low battery probability threshold, the first policy to improve performance of the computing system, the second policy to improve energy efficiency of the computing system.

Example 25 includes the method of example 22, wherein the policy is a first policy, and adjusting the policy includes adjusting the first policy to a second policy in response to the probability not satisfying a low battery probability threshold, the first policy to improve energy efficiency of the computing system, the second policy to improve performance of the computing system.

Example 26 includes the method of example 22, wherein the policy is representative of improving performance of the computing system, and adjusting the policy includes at least one of increasing a first frequency associated with a hardware resource, increasing a second frequency associated with a software resource, or increasing power delivery to an antenna.

Example 27 includes the method of example 22, wherein the adjustment includes at least one of adjusting a first frequency associated with a hardware resource, a second frequency associated with a software resource, or power delivery to an antenna.

Example 28 includes the method of example 22, wherein the adjustment is a first adjustment representative of a first state of a hardware resource, and further including, in response to the battery capacity not satisfying the threshold, determining a second adjustment representative of a second state of the hardware resource, the first state to cause a first energy expenditure greater than a second energy expenditure by the second state.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus for device power management, the apparatus comprising:
    interface circuitry to obtain data from an electronic system;
    machine readable instructions; and
    processor circuitry to execute the machine readable instructions to:
        determine a probability that the electronic system is to operate with a low battery power level based on a classification of usage of the electronic system;
        determine an adjustment from a first active performance state to a second active performance state to increase performance of the electronic system;
        determine, based on the probability not satisfying a threshold, that the electronic system is to be charged before a future battery power level of the electronic system falls beneath a battery power level below which the electronic system turns off, the future battery power level to occur in response to the adjustment; and make the adjustment from the first active performance state to the second active performance state to cause at least one of an increase of a first frequency associated with a first hardware resource of the electronic system, an increase of a second frequency associated with a software resource of the electronic system, or an increase of power delivery to the first hardware resource or a second hardware resource of the electronic system, the at least one of the increase of the first frequency, the increase of the second frequency, or the increase of the power delivery to the first hardware resource or the second hardware resource to increase the performance of the electronic system.

2. The apparatus of claim 1, wherein the data is telemetry data, and the interface circuitry is to determine a telemetry parameter based on the telemetry data from the electronic system, the telemetry parameter based on at least one of a location, a process, a power transition event, or a power source associated with the electronic system.

3. The apparatus of claim 1, wherein the processor circuitry is to adjust a first policy to a second policy based on the adjustment, the second policy to improve the performance of the electronic system, the first policy to improve energy efficiency of the electronic system.

4. The apparatus of claim 1, wherein the battery power level is a first battery power level, and the processor circuitry is to adjust a first policy to a second policy after a first determination that the probability satisfies the threshold and a second determination that the future battery power level will fall beneath a second battery power level, the second policy to improve energy efficiency of the electronic system, the first policy to improve the performance of the electronic system.

5. The apparatus of claim 1, wherein the second hardware resource is an antenna, and the processor circuitry is to make the adjustment to cause at least one of an increase of a third frequency associated with the antenna, the increase of the second frequency associated with the software resource, or an increase of the power delivery to the first hardware resource or the antenna, the software resource to control operation of at least one of the first hardware resource or the antenna.

6. The apparatus of claim 1, wherein the first active performance state is associated with a first energy expenditure, the first energy expenditure is less than a second energy expenditure associated with the second active performance state.

7. The apparatus of claim 1, wherein the processor circuitry is to determine the future battery power level based on an operation of the electronic system in response to the adjustment.

8. The apparatus of claim 1, wherein the processor circuitry is to determine that the electronic system is to be charged before the future battery power level of the electronic system falls beneath the battery power level based on a determination that the classification of the usage is associated with a user that has high low-battery anxiety, the user with high low battery anxiety unlikely to wait until the future battery power level falls beneath the battery power level before charging the electronic system.

9. A non-transitory computer readable storage device comprising instructions that, when executed, cause processor circuitry to at least:

determine a probability that an electronic system is to operate with a low battery charge based on a classification of usage of the electronic system;

determine an adjustment from a first active performance state to a second active performance state to increase performance of the electronic system;

determine, based on the probability not satisfying a threshold, that the electronic system is to be charged before a future battery charge of the electronic system falls beneath a battery charge at which the electronic system shuts down, the future battery charge to occur in response to the adjustment; and cause the adjustment from the first active performance state to the second active performance state to cause at least one of an increase of a first frequency associated with a first hardware resource of the electronic system, an increase of a second frequency associated with a software resource of the electronic system, or an increase of power delivery to the first hardware resource or a second hardware resource of the electronic system.

10. The non-transitory computer readable storage device of claim 9, wherein the instructions, when executed, cause the processor circuitry to determine a telemetry parameter based on telemetry data from the electronic system, the telemetry parameter based on at least one of a location, a process, a power transition event, or a power source associated with the electronic system.

11. The non-transitory computer readable storage device of claim 9, wherein the instructions, when executed, cause the processor circuitry to change a first policy to a second policy based on the adjustment, the second policy to improve the performance of the electronic system, the first policy to improve energy efficiency of the electronic system.

12. The non-transitory computer readable storage device of claim 9, wherein the battery charge is a first battery charge, and the instructions, when executed, cause the processor circuitry to change a first policy to a second policy after a first determination that the probability satisfies the threshold and a second determination that the future battery charge will fall beneath a second battery charge, the second policy to improve energy efficiency of the electronic system, the first policy to improve the performance of the electronic system.

13. The non-transitory computer readable storage device of claim 9, wherein the second hardware resource is an antenna, and the instructions, when executed, cause the processor circuitry to cause the adjustment to cause at least one of an increase of a third frequency associated with the antenna, the increase of the second frequency associated with the software resource, or the increase of the power delivery to the antenna, the software resource to control operation of the antenna.

14. The non-transitory computer readable storage device of claim 9, wherein the first active performance state is associated with a first energy expenditure less than a second energy expenditure associated with the second active performance state.

15. The non-transitory computer readable storage device of claim 9, wherein the instructions, when executed, cause the processor circuitry to determine the future battery charge based on an operation of the electronic system in response to the adjustment.

16. The non-transitory computer readable storage device of claim 9, wherein the instructions cause the processor circuitry to determine that the electronic system is to be charged before the future battery charge of the electronic system falls beneath the battery charge based on a determination that the classification of the usage is associated with a user that exhibits low-battery anxiety.

17. An apparatus for device power management, the apparatus comprising:
means for determining a probability that an electronic system is to operate with a low battery power charge level based on a classification of usage of the electronic system;
means for identifying an adjustment from a first active performance state to a second active performance state to increase performance of the electronic system;
means for predicting, based on the probability not satisfying a threshold, that the electronic system is to be charged before a battery power charge level of the electronic system crosses a threshold below which the electronic system powers off, the battery power charge level to occur after the adjustment; and
means for adjusting the electronic system from the first active performance state to the second active performance state to increase at least one of: a first frequency associated with a first hardware resource of the electronic system, a second frequency associated with a software resource of the electronic system, or power delivery to the first hardware resource or a second hardware resource of the electronic system.

18. The apparatus of claim 17, wherein the means for determining is first means for determining, and further including second means for determining a telemetry parameter based on telemetry data from the electronic system, the telemetry parameter based on at least one of a location, a process, a power transition event, or a power source associated with the electronic system.

19. The apparatus of claim 17, wherein the means for adjusting is to adjust a first policy to a second policy based on the adjustment, the second policy to improve the performance of the electronic system, the first policy to improve energy efficiency of the electronic system.

20. The apparatus of claim 17, wherein the battery power charge level is a first battery power charge level, the threshold is a first threshold, and the means for adjusting is to adjust a first policy to a second policy after a first determination that the probability crosses above the first threshold and a second determination that the battery power charge level will be lower than a second threshold, the second policy to improve energy efficiency of the electronic system, the first policy to improve the performance of the electronic system.

21. The apparatus of claim 17, wherein the second hardware resource is an antenna, and the means for adjusting is to make the adjustment to cause at least one of an increase of a third frequency associated with the antenna, the increase of the second frequency associated with the software resource, or the increase in the power delivery to the antenna, the software resource to control operation of the antenna.

22. The apparatus of claim 17, wherein the first active performance state is associated with a first energy expenditure less than a second energy expenditure associated with the second active performance state.

23. A method for device power management, the method comprising:
determining a probability that an electronic system is to operate with a low battery charge based on a classification of usage of the electronic system;
determining an adjustment from a first active performance state to a second active performance state to increase performance of the electronic system;
predicting, based on the probability not satisfying a threshold, that the electronic system is to be charged before a battery charge of the electronic system drops below a threshold at which the electronic system turns off, the battery charge to occur after the adjustment is made; and
changing the first active performance state to the second active performance state to increase at least one of: a first frequency associated with a first hardware resource of the electronic system, a second frequency associated with a software resource of the electronic system, or power delivery to the first hardware resource or a second hardware resource of the electronic system.

24. The method of claim 23, further including determining a telemetry parameter based on telemetry data from the electronic system, the telemetry parameter based on at least one of a location, a process, a power transition event, or a power source associated with the electronic system.

25. The method of claim 23, further including adjusting a first policy to a second policy based on the adjustment, the second policy to improve the performance of the electronic system, the first policy to improve energy efficiency of the electronic system.

26. The method of claim 23, wherein the threshold is a first threshold, and further including adjusting a first policy to a second policy after determining that the probability is above the first threshold and the battery charge will drop below a second threshold, the second policy to improve energy efficiency of the electronic system, the first policy to improve the performance of the electronic system.

27. The method of claim 23, wherein the second hardware resource is at least one of an antenna or antenna circuitry, and the changing of the first active performance state to the second active performance state causes at least one of: a third frequency associated with the at least one of the antenna or the antenna circuitry, the second frequency associated with the software resource, or the power delivery to the antenna or the antenna circuitry, the software resource to control operation of the at least one of the antenna or the antenna circuitry.

28. The method of claim 23, wherein the first active performance state is associated with a first energy expenditure less than a second energy expenditure associated with the second active performance state.

* * * * *

UNITED STATES PATENT AND TRADEMARK OFFICE
CERTIFICATE OF CORRECTION

| | |
|---|---|
| PATENT NO. | : 11,650,648 B2 |
| APPLICATION NO. | : 16/914029 |
| DATED | : May 16, 2023 |
| INVENTOR(S) | : Nge et al. |

Page 1 of 1

It is certified that error appears in the above-identified patent and that said Letters Patent is hereby corrected as shown below:

On the Title Page

In Item (72), under Inventor, delete "Maximilian" and insert -- Maximillan --

In the Claims

On Column 39, Claim 8, Lines 64, 65, 66 and 67, delete ", the user with high low battery anxiety unlikely to wait until the future battery power level falls beneath the battery power level before charging the electronic system"

Signed and Sealed this
Fourth Day of July, 2023

Katherine Kelly Vidal
*Director of the United States Patent and Trademark Office*